US008783822B2

(12) United States Patent
Sakurada

(10) Patent No.: US 8,783,822 B2
(45) Date of Patent: Jul. 22, 2014

(54) RECORDING DEVICE AND CONTROL METHOD

(71) Applicant: Yuichi Sakurada, Tokyo (JP)

(72) Inventor: Yuichi Sakurada, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 25 days.

(21) Appl. No.: 13/714,464

(22) Filed: Dec. 14, 2012

(65) Prior Publication Data

US 2013/0155136 A1 Jun. 20, 2013

(30) Foreign Application Priority Data

Dec. 16, 2011 (JP) ................................. 2011-275856

(51) Int. Cl.

*B41J 29/393* (2006.01)
*G01N 21/47* (2006.01)
*B41J 2/045* (2006.01)

(52) U.S. Cl.

CPC ............ *B41J 2/0451* (2013.01); *B41J 2/04561* (2013.01)
USPC ............................................... 347/19; 356/72

(58) Field of Classification Search

CPC ............................ B41J 2/04561; B41J 2/0451
See application file for complete search history.

(56) References Cited

U.S. PATENT DOCUMENTS

| | | | | |
|---|---|---|---|---|
| 2002/0135764 | A1* | 9/2002 | Oka et al. | 356/338 |
| 2003/0095162 | A1* | 5/2003 | Endo | 347/19 |
| 2004/0095410 | A1* | 5/2004 | Miyashita | 347/19 |
| 2008/0036814 | A1* | 2/2008 | Takeishi et al. | 347/19 |
| 2010/0182369 | A1* | 7/2010 | Otsuka et al. | 347/19 |

FOREIGN PATENT DOCUMENTS

| | | |
|---|---|---|
| JP | 2009-113225 | 5/2009 |
| JP | 2012-187917 | 10/2012 |

* cited by examiner

*Primary Examiner* — Shelby Fidler
(74) *Attorney, Agent, or Firm* — Harness, Dickey & Pierce, P.L.C.

(57) ABSTRACT

A recording device includes: a detection unit converting scattering light generated by intersection between light emitted from a light-emitting unit and an ink droplet discharged from each nozzle of a nozzle array, into an electric signal in a light-receiving unit; a first signal generation unit amplifying the electric signal to generate a first electric signal; a determination unit determining presence or absence of an ink droplet based on a second electric signal representing change of the first electric signal; a relation information generation unit generating relation information in which an amplification value corresponding to the first electric signal generated when an arbitrary nozzle of the nozzle array discharges an ink droplet and the arbitrary nozzle are associated with each other; and a control unit performing control to amplify the electric signal at an amplification value according to a corresponding nozzle based on the relation information.

6 Claims, 20 Drawing Sheets

RECORDING DEVICE AND CONTROL METHOD

CROSS-REFERENCE TO RELATED APPLICATIONS

The present application claims priority to and incorporates by reference the entire contents of Japanese Patent Application No. 2011-275856 filed in Japan on Dec. 16, 2011.

BACKGROUND OF THE INVENTION

1. Field of the Invention

The present invention relates to a recording device such as an inkjet printer.

2. Description of the Related Art

Inkjet type recording devices record an image (dots) on a recording medium by reciprocating a carriage having a recording head mounted thereon, in a main-scanning direction and discharging ink droplets from a nozzle array of the recording head during this reciprocation. Then, the recording medium is fed using a feed roller or the like in a sub-scanning direction, and the recording in the main-scanning direction is repeated; thus, the image is formed on the recording medium.

Some of the aforementioned recording devices include a liquid discharge defect detection device including a light-emitting unit emitting light toward an ink droplet discharged from the nozzle array of a recording head, a light-receiving unit receiving the light emitted from the light-emitting unit, arranged so that light emitted from the light-emitting unit collides with an ink droplet, and detecting a discharge defect of the ink droplet based on an output change of the light received in the light-receiving unit (for example, see Japanese Patent Application Laid-open No. 2009-113225).

Japanese Patent Application Laid-open No. 2009-113225 has disclosed a scattering light detection type liquid discharge defect detection device. A configuration in which, for example, as illustrated in FIG. 19, scattering light components S5, S7, S9, and S11 are reflected on a reflection member 40 and converged on a light-receiving unit 33 is employed to increase an amount of scattering light received by the light-receiving unit 33. This clarifies a difference in an amount of receiving light between in the case where there is an ink droplet and in the case where there is no ink droplet. This improves reliability of detecting a liquid droplet defect.

In a general inkjet type recording device, for example, as illustrated in FIG. 20A, an ink droplet b1 is discharged from a nozzle hole Nx in a nozzle plane Hm of a recording head. Then, ink droplets b2 and b3 are successively discharged (see FIG. 20B), and unite during flight and then become one ink droplet B (see FIGS. 20C and 20D). With this ink droplet B, an image (a dot) is recorded on a recording medium. Note that as illustrated in FIGS. 20C and 20D, the ones that fly behind the ink droplet B are not united, and ink droplets that do not become the ink droplet B are called satellites Bs. Since the satellites Bs are smaller than the ink droplet B, the satellites Bs are affected easily by air resistance and soon start to float out of the flight track of the ink droplet B (see FIGS. 20E and 20F). The floating satellites B are called mist m.

In Japanese Patent Application Laid-open No. 2009-113225, the reflection member 40 is provided as illustrated in FIG. 19; therefore, because of the influence of the mist m described above, the reflection member 40 becomes dirty due to the mist m. When the reflection member 40 becomes dirty due to the mist m, it becomes impossible to efficiently converge scattering light on the light-receiving unit 33, making it difficult to clarify a difference in an amount of receiving light between in the case where there is an ink droplet and in the case where there are no ink droplets.

There is a need to provide a recording device capable of clarifying a difference in an amount of receiving light between in the case where there is an ink droplet and in the case where there are no ink droplets, without using a reflection member or the like.

SUMMARY OF THE INVENTION

It is an object of the present invention to at least partially solve the problems in the conventional technology. A recording device including a nozzle array including a plurality of nozzles to discharge ink droplets, comprising:

A recording device includes a nozzle array including a plurality of nozzles to discharge ink droplets. The recording device includes: a detection unit including a pair of a light-emitting unit and a light-receiving unit and converting scattering light generated by intersection between light emitted from the light-emitting unit and an ink droplet discharged from each of the nozzles of the nozzle array, into an electric signal in the light-receiving unit; a first signal generation unit amplifying the electric signal converted by the light-receiving unit to generate a first electric signal; a second signal generation unit generating a second electric signal representing change of the first electric signal; a determination unit determining presence or absence of an ink droplet based on the second electric signal; a relation information generation unit generating relation information in which an amplification value corresponding to the first electric signal generated when an arbitrary nozzle of the nozzle array discharges an ink droplet and the arbitrary nozzle are associated with each other; and a control unit performing control to amplify the electric signal at an amplification value according to a corresponding nozzle based on the relation information when ink droplets are sequentially discharged from the respective nozzles of the nozzle array.

A control method is performed in a recording device including a nozzle array including a plurality of nozzles to discharge ink droplets. The control method includes: a detection step of converting scattering light generated by intersection between light emitted from a light-emitting unit and an ink droplet discharged from each of the nozzles of the nozzle array into an electric signal in a light-receiving unit; a first signal generation step of amplifying the electric signal converted in the detection step to generate a first electric signal; a second signal generation step of generating a second electric signal representing change of the first electric signal; a determination step of determining presence or absence of an ink droplet based on the second electric signal; a relation information generation step of generating relation information in which an amplification value corresponding to the first electric signal generated when an arbitrary nozzle of the nozzle array discharges an ink droplet and the arbitrary nozzle are associated with each other; and a control step of performing control to amplify the electric signal at an amplification value according to a corresponding nozzle based on the relation information when ink droplets are sequentially discharged from respective nozzles of the nozzle array.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Summary of Recording Device According to this Embodiment

Figure 2:
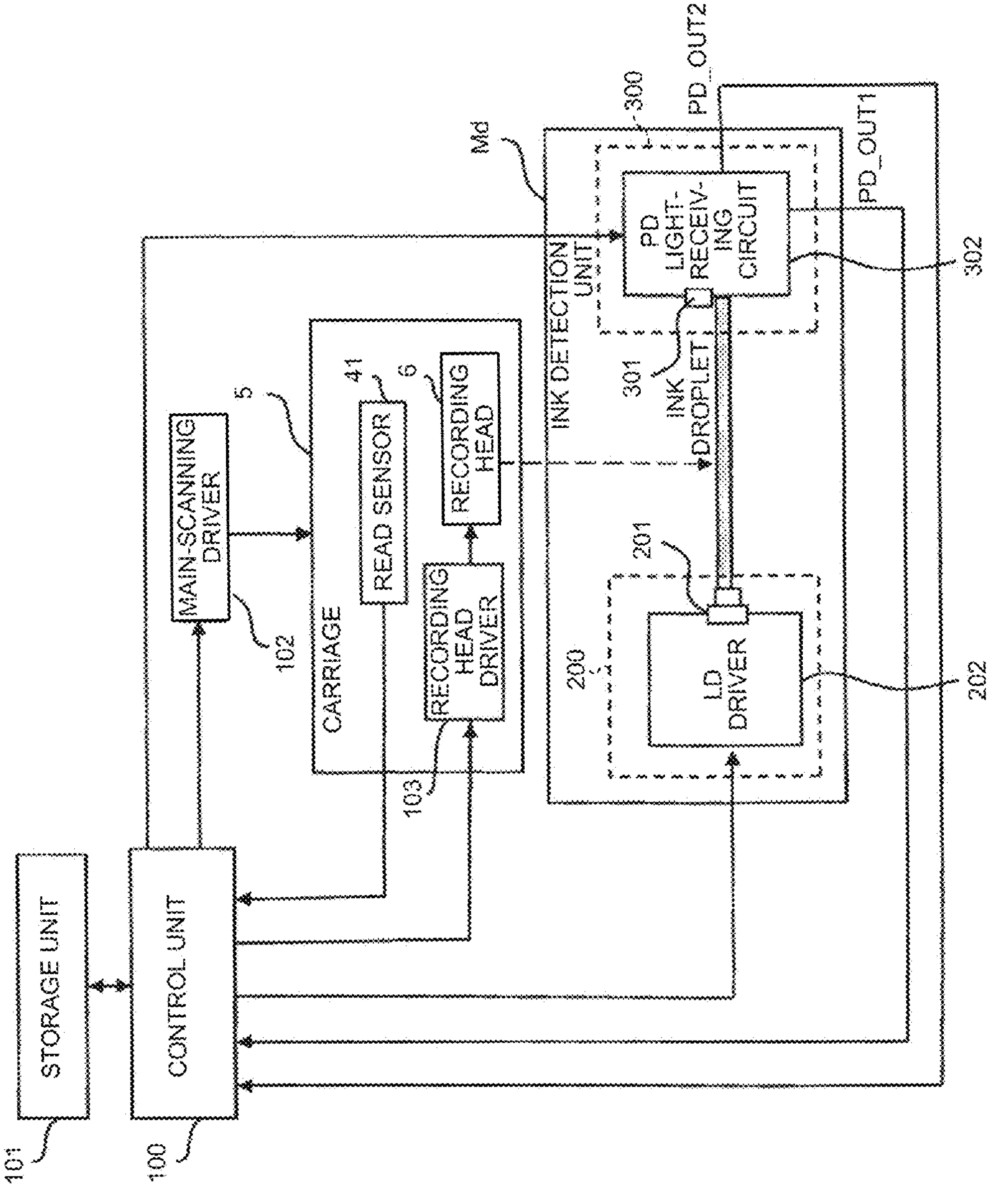
FIG. 2 illustrates a schematic configuration example of a control mechanism of a recording device according to the embodiment.
Figure 8:
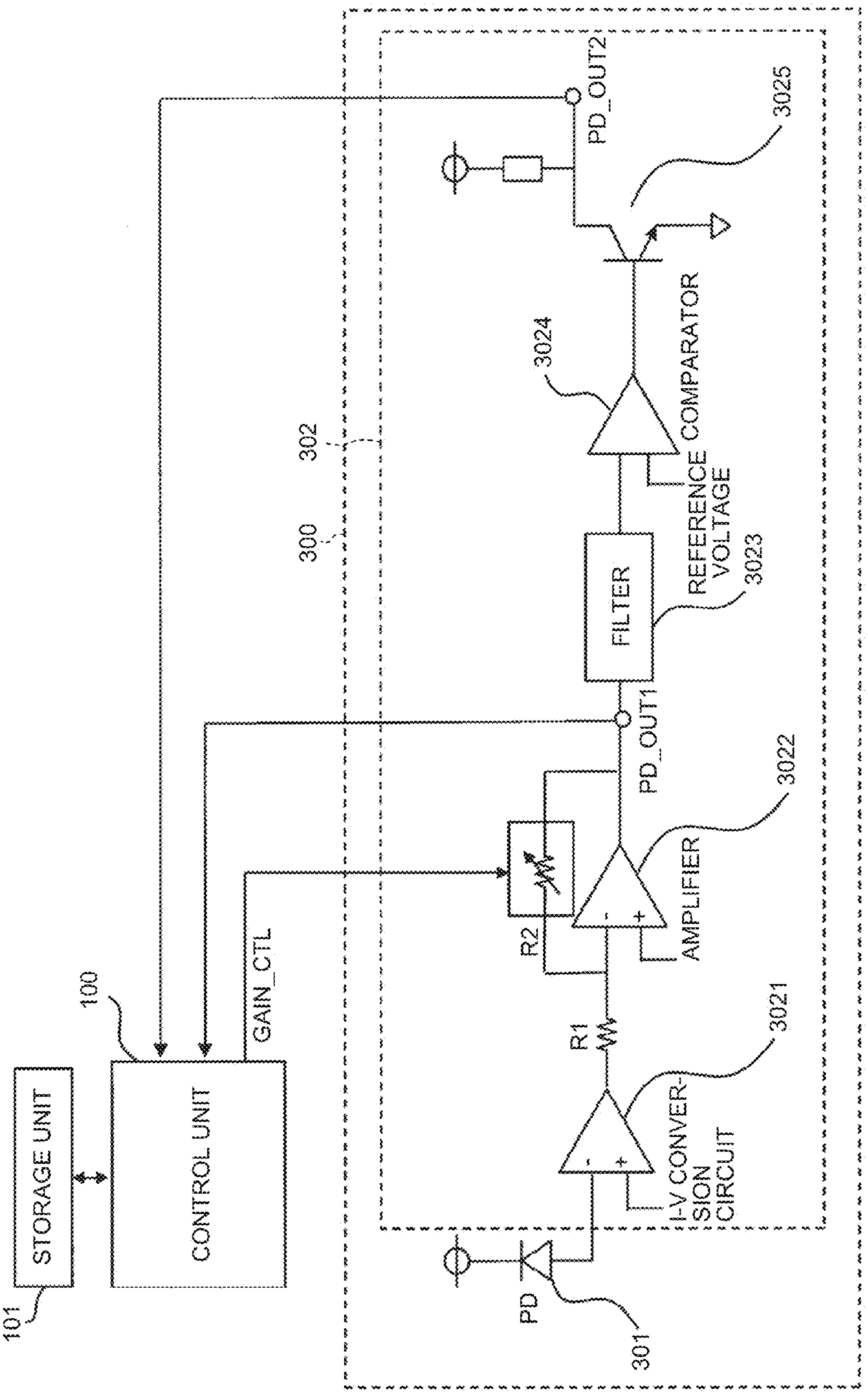
FIG. 8 illustrates a schematic configuration example of a light-receiving unit 300.

First, the summary of a recording device according to this embodiment is described with reference to FIG. 2 and FIG. 8. FIG. 2 illustrates a schematic configuration example of a control mechanism of a recording device according to this embodiment, and FIG. 8 illustrates a schematic configuration example of the light-receiving unit 300 illustrated in FIG. 2.

The recording device according to this embodiment includes a nozzle array including a plurality of nozzles to discharge ink droplets. The recording device according to this embodiment includes: a detection unit (corresponding to the ink detection unit Md illustrated in FIG. 2) including a pair of a light-emitting unit 200 and the light-receiving unit 300 and converting scattering light generated by intersection between light emitted from the light-emitting unit 200 and an ink droplet discharged from each nozzle of the nozzle array, into an electric signal in the light-receiving unit 300; a first signal generation unit (corresponding to an amplifier 3022 illustrated in FIG. 8) amplifying the electric signal converted by the light-receiving unit 300 to generate a first electric signal (PD_OUT1); a second signal generation unit (corresponding to a comparator 3024 illustrated in FIG. 8) generating a second electric signal (PD_OUT2) representing change of the first electric signal (PD_OUT1); a determination unit (corresponding to a control unit 100 illustrated in FIG. 2 and FIG. 8) determining the presence or absence of an ink droplet based on the second electric signal (PD_OUT2); a relation information generation unit (corresponding to the control unit 100 illustrated in FIG. 2 and FIG. 8) generating relation information in which an amplification value corresponding to the first electric signal (PD_OUT1) generated when an arbitrary nozzle of the nozzle array discharges an ink droplet and the arbitrary nozzle are associated with each other; and a control unit (corresponding to the control unit 100 illustrated in FIG. 2 and FIG. 8) performing control to amplify the electric signal at an amplification value according to a corresponding nozzle based on the relation information when ink droplets are sequentially discharged from respective nozzles of the nozzle array.

By having the aforementioned structure, the recording device according to this embodiment can increase an output level of the first electric signal (PD_OUT1) even when the electric signal obtained in the light-receiving unit 300 when scattering light is generated is weak, and can generate the second electric signal (PD_OUT2) that represents change of the first electric signal (PD_OUT1). As a result, a difference in an amount of receiving light between in the case where there is an ink droplet and in the case where there are no ink droplets can be clarified and thus ink detection can be performed. The recording device according to this embodiment is specifically described below with reference to attached drawings.

First Embodiment

Schematic Configuration Example of Recording Device

Figure 1:
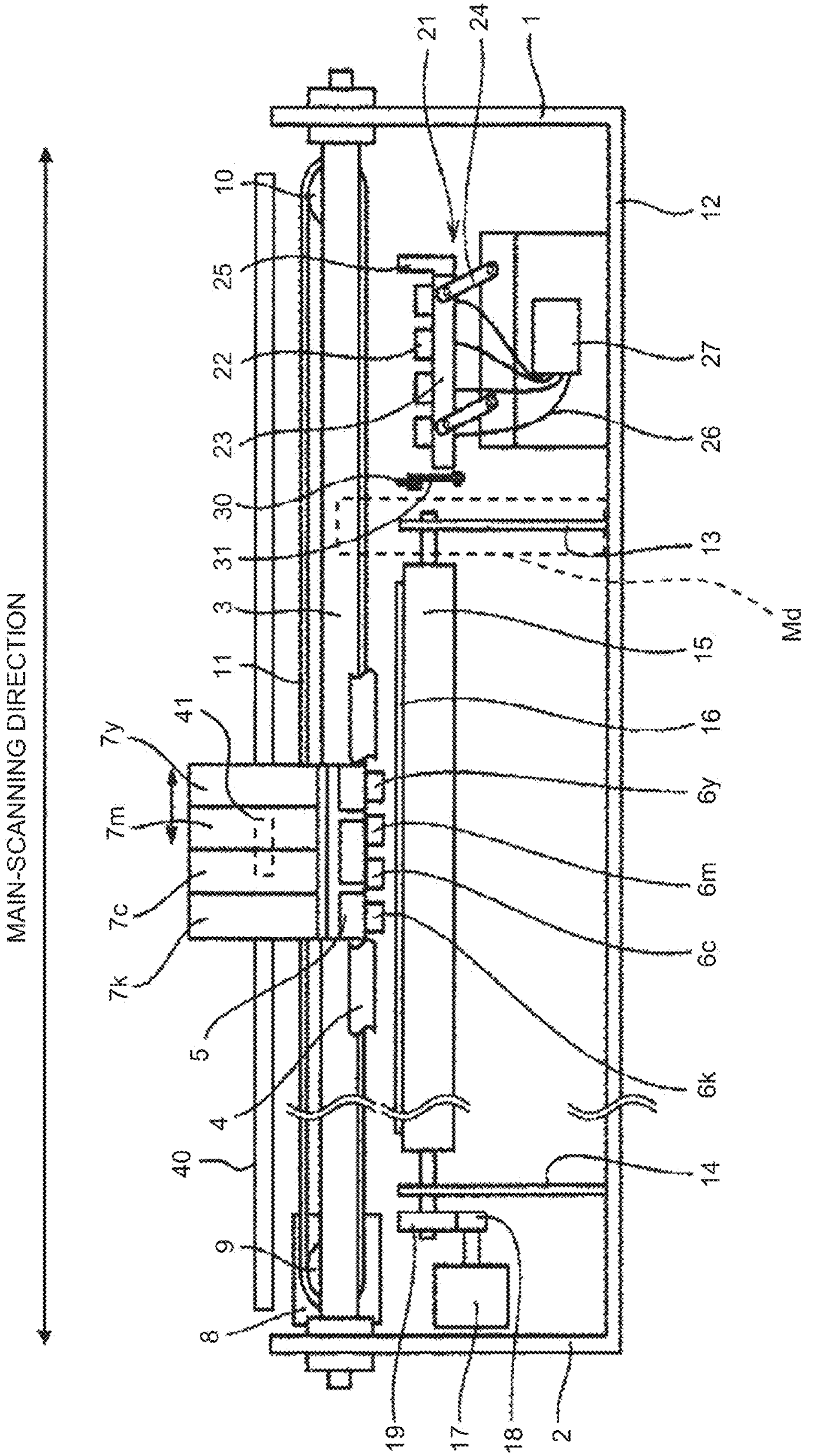
FIG. 1 illustrates a schematic configuration example of a recording device according to an embodiment.

First, the schematic configuration example of a recording device according to this embodiment is described with reference to FIG. 1.

The recording device according to this embodiment includes a main support guide rod 3 and a sub-support guide rod 4 which are laterally supported in an approximately horizontal position between side plates 1 and 2 on both sides. The main support guide rod 3 and the sub-support guide rod 4 support a carriage 5 in a manner that the carriage 5 can slide freely in a main-scanning direction.

Four recording heads 6 to discharge a yellow (Y) ink, a magenta (M) ink, a cyan (C) ink, and a black (Bk) ink are mounted on the carriage 5 such that discharge planes (nozzle planes) of the recording heads 6 face downward. Four ink cartridges 7 (reference symbol "7" denotes any one or all of the ink cartridges) are mounted on the carriage 5 above the recording heads 6 (reference symbol "6" denotes any one of or all of the recording heads) in a manner that the ink cartridges 7 in an exchangeable manner. The ink cartridges 7 are ink suppliers for respective colors to supply ink to the respective four recording heads 6. The carriage 5 is connected to a timing belt 11 extended between a drive pulley (drive timing pulley) 9 rotated by a main-scanning motor 8 and a driven pulley (idler pulley) 10, so that drive control of the main-scanning motor 8 causes the carriage 5 to move in the main-scanning direction. Movement in the main-scanning direction is controlled based on an encoder value obtained by providing the carriage 5 with a read sensor 41 and detecting a mark of an encoder 40 with the read sensor 41. The mark is, for example, a scale or a slit.

The recording device according to this embodiment has a configuration in which subframes 13 and 14 are provided to stand on a bottom plate 12 connecting the side plates 1 and 2 and a feed roller 15 is rotatably supported between the subframes 13 and 14. Further, a sub-scanning motor 17 is installed on the subframe 14 side, and a gear 18 fixed to a rotating shaft of the sub-scanning motor 17 and a gear 19 fixed to a shaft of the feed roller 15 are provided to transmit rotation of the sub-scanning motor 17 to the feed roller 15.

A reliability maintenance and recovery mechanism 21 (hereinafter called "subsystem") for the recording head 6 is disposed between the side plate 1 and the subframe 13. In the subsystem 21, four cap units 22 to cap the discharge planes of the recording heads 6 are held by a holder 23, and this holder 23 is swingably held by a link member 24. Thus, when the carriage 5 is moved in the main-scanning direction and is in contact with an engaging portion 25 provided in the holder 23, the holder 23 is lifted up to cap the discharge planes of the recording heads 6 with the cap units 22. When the carriage 5 is moved to the image formation region 16 side, the holder 23 lifts down to cause the cap units 22 to separate from the discharge planes of the recording heads 6.

Note that the cap units 22 are connected to a suction pump 27 via suction tubes 26, and an atmospheric opening is formed through which the cap units 22 link to the atmosphere via an atmosphere opening tube and an atmosphere opening valve. The suction pump 27 can discharge sucked liquid waste (ink waste) into a liquid waste accumulation tank.

At a side of the holder 23, a wiper blade 30 to wipe the discharge planes of the recording heads 6 is attached to a blade arm 31. This blade arm 31 is swingably supported so that the blade arm 31 is swung by rotation of a cam that is rotated by a drive unit which is not illustrated.

Configuration Example of Control Mechanism of Recording Device

Next, a configuration example of the control mechanism of the recording device according to this embodiment is described with reference to FIG. 2.

The control mechanism of the recording device according to this embodiment includes the control unit 100, a storage unit 101, a main-scanning driver 102, a recording head driver 103, an LD driver 202, the PD light-receiving circuit 302, and the like.

The control unit 100 supplies record data and a drive control signal (pulse signal) to the storage unit 101 and each driver, thereby controlling the entire recording device. The control unit 100 controls drive of the carriage 5 in the main-scanning direction via the main-scanning driver 102, controls discharge timing of ink droplets from the recording heads 6 via the recording head driver 103, and controls light emission timing of light emitted from an LD 201 via the LD driver 202.

The storage unit 101 stores predetermined information. For example, the storage unit 101 stores a program such as for a process procedure to be executed in the control unit 100. The storage unit 101 further stores first table information in which scattering light intensity (PD_OUT1) and a gain value are associated with each other. The scattering light intensity (PD_OUT1) is an electric signal obtained by amplifying an electric signal obtained when a PD 301 receives scattering light. Scattering light is light generated by intersection between LD light emitted from the LD 201 and an ink droplet discharged from a nozzle of the recording head 6. The gain value is an amplification value used to generate the scattering light intensity (PD_OUT1). The PD light-receiving circuit 302 generates the scattering light intensity (PD_OUT1) by amplifying an electric signal obtained from the PD 301 by the gain value, and outputs the generated scattering light intensity (PD_OUT1) to the control unit 100. Moreover, the PD light-receiving circuit 302 generates an electric signal (PD_OUT2) representing change of the scattering light intensity (PD_OUT1) and outputs the generated electric signal (PD_OUT2) to the control unit 100.

The control unit 100 according to this embodiment controls the main-scanning driver 102, the carriage 5, the recording head driver 103, the recording head 6, the LD driver 202, the LD 201, and the like, and makes the LD 201 emit LD light in a state that movement of the carriage 5 is stopped, makes the recording head 6 discharge an ink droplet from arbitrary nozzle, and acquires scattering light intensity (PD_OUT1) as described above from the PD light-receiving circuit 302. Then, the control unit 100 acquires gain values corresponding to the scattering light intensity (PD_OUT1) acquired from the PD light-receiving circuit 302 with reference to the first table information stored in the storage unit 101, and generates and holds second table information in which the gain value and the arbitrary nozzle are associated with each other. Moreover, the control unit 100 adjusts the gain value of the PD light-receiving circuit 302 based on the second table information when an ink droplet is discharged from each nozzle of the recording head 6, and performs control so that the electric signal obtained from the PD 301 when an ink droplet is discharged from each nozzle is amplified by a gain value that corresponds to that nozzle. Thus, the PD light-receiving circuit 302 can generate scattering light intensity (PD_OUT1) amplified by a gain value corresponding to each nozzle. Note that the PD light-receiving circuit 302 generates the electric signal (PD_OUT2) representing change of the generated scattering light intensity (PD_OUT1) and outputs the generated electric signal (PD_OUT2) to the control unit 100. The control unit 100 acquires the electric signal (PD_OUT2) representing change of the scattering light intensity (PD_OUT1) from the PD light-receiving circuit 302, and determines whether an ink droplet discharged from each nozzle of the recording head 6 is detected or not based on an output level of the acquired electric signal (PD_OUT2). When an ink droplet has been detected, the control unit 100 determines that a nozzle has discharged the ink droplet. When an ink droplet has not been detected, the control unit 100 determines that a nozzle has not discharged the ink droplet (nozzle deficiency).

Figure 3:
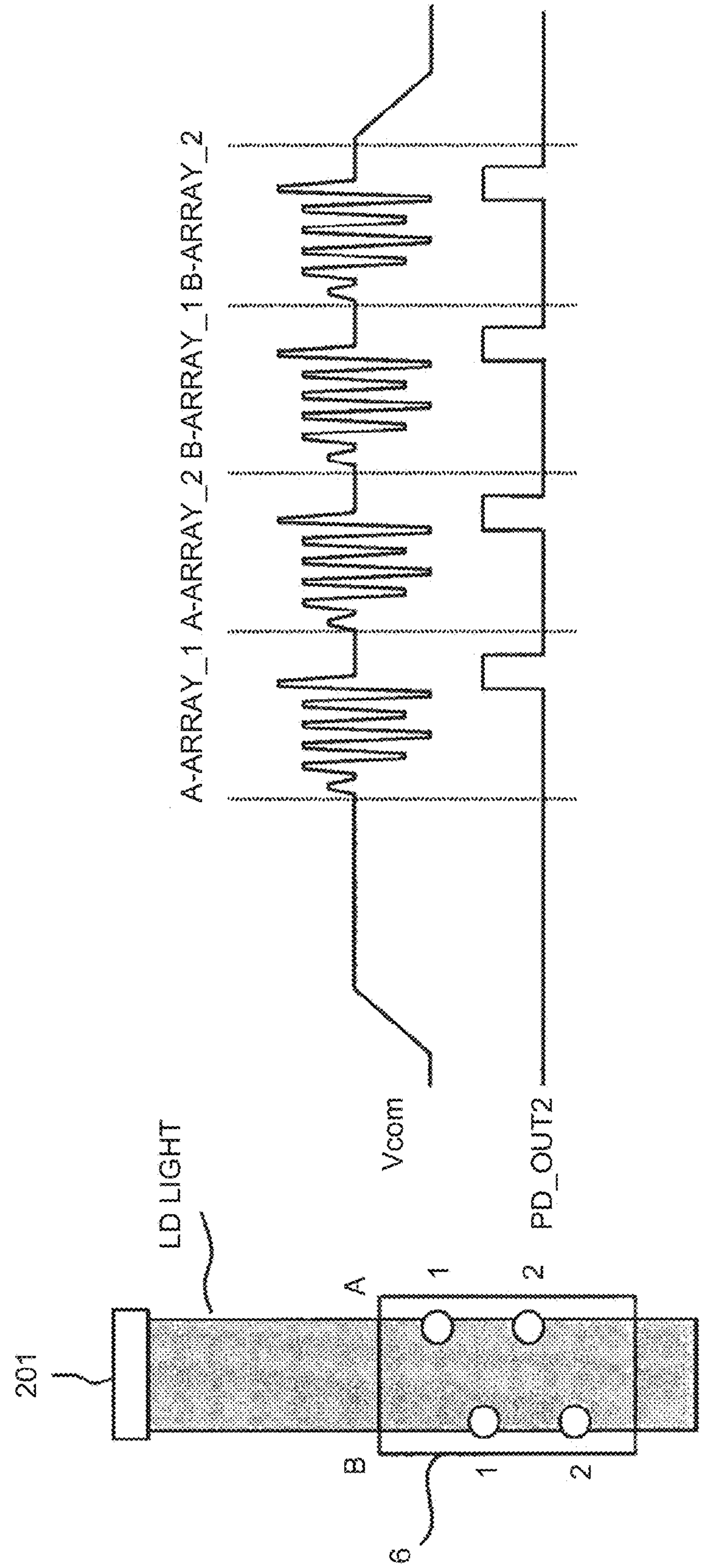
FIG. 3 is a first diagram illustrating a processing operation example of ink detection.

For example, the recording head driver 103 outputs a drive waveform (Vcom) so that nozzles of nozzle numbers (nozzle 1 and nozzle 2) of the nozzle arrays (A-array and B-array) of the recording head 6 specified by the control unit 100 discharge ink droplets as illustrated in FIG. 3. When ink droplets are normally discharged from the nozzles of the nozzle numbers of the recording head 6 specified by the control unit 100 and intersect with the LD light, scattering light is generated, and the PD light-receiving circuit 302 of the ink detection unit Md amplifies the electric signal obtained in the PD 301 at gain values corresponding to the nozzles of the numbers and generate the scattering light intensity (PD_OUT1). Moreover, the PD light-receiving circuit 302 generates the electric signal (PD_OUT2) representing change of the scattering light intensity (PD_OUT1) and outputs the electric signal (PD_OUT2) to the control unit 100. Thus, as illustrated in FIG. 3, scattering light is generated when the nozzle 1 in the A array (A-array__1), the nozzle 2 in the A array (A-array__2), the nozzle 1 in the B array (B-array__1), and the nozzle 2 in the B array (B-array__2) discharge the ink droplets, and the control unit 100 acquires the electric signal (PD_OUT2) that indicates presence of the ink droplets discharged from the nozzle 1 in the A array (A-array__1), the nozzle 2 in the A array (A-array__2), the nozzle 1 in the B array (B-array__1), and the nozzle 2 in the B array (B-array__2).

Figure 4:
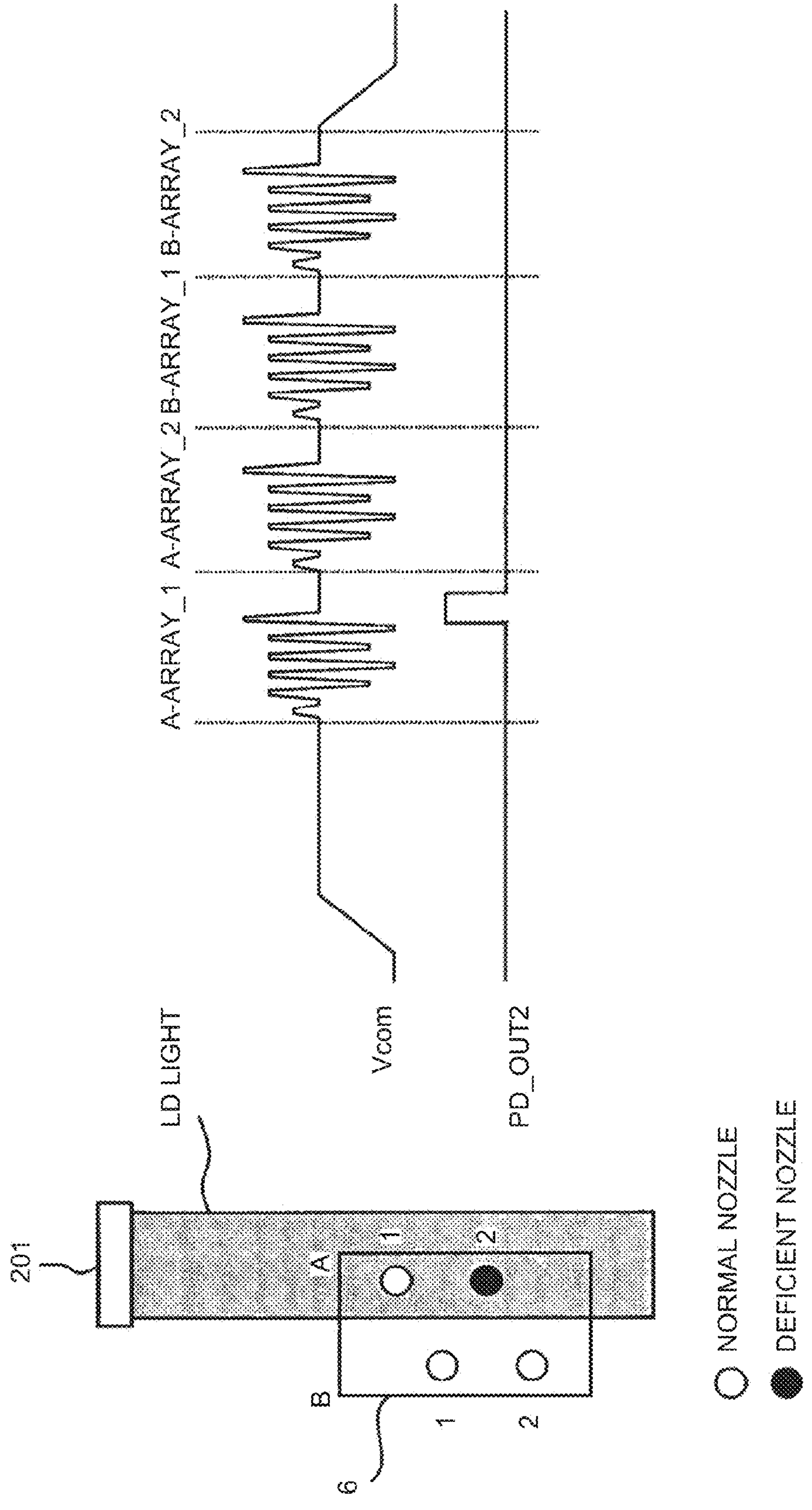
FIG. 4 is a second diagram illustrating a processing operation example of ink detection.

On the contrary, as illustrated in FIG. 4, when an ink droplet is not discharged due to nozzle clogging or the like (the nozzle 2 in the A array) or when an ink droplet is discharged but the LD light and a nozzle position are not aligned (the nozzle 1 and the nozzle 2 in the B array), the output of the drive waveform (Vcom) the same as in FIG. 3 from the recording head driver 103 does not cause the ink droplet and the LD light to intersect with each other; therefore, scattering light is not generated and the PD light-receiving circuit 302 of the ink detection part Md does not output the electric signal (PD_OUT2) indicating presence of the ink droplet. Accordingly, as illustrated in FIG. 4, scattering light is generated only when the nozzle 1 in the A array (A-array__1) discharges an ink droplet, and the control unit 100 obtains the electric signal (PD_OUT2) indicating presence of the ink droplet discharged from the nozzle 1 in the A array (A-array__1).

Since the control unit 100 specifies a nozzle array and a nozzle number of a nozzle which discharges an ink droplet, the control unit 100 can determine the nozzle number and the nozzle array for which the electric signal (PD_OUT2) is received from the PD light-receiving circuit 302 of the ink detection unit Md. Thus, the control unit 100 can specify the nozzle number and the nozzle array of the nozzle that has discharged the ink droplet based on the electric signal (PD_OUT2) acquired from the PD light-receiving circuit 302 of the ink detection unit Md.

Note that in FIG. 3 and FIG. 4, the two nozzles (the nozzle 1 and the nozzle 2) for each one nozzle array are used to discharge ink droplets, thereby increasing accuracy of detecting an ink droplet. Alternatively, a configuration can be employed in which at least one nozzle for each one nozzle array is used to discharge the ink droplet.

Configuration Example and Placement Position of Ink Detection Unit Md

Next, the configuration example and the placement position of the ink detection unit Md are described with reference to FIG. 2 and FIG. 5 to FIG. 8.

Figure 5:
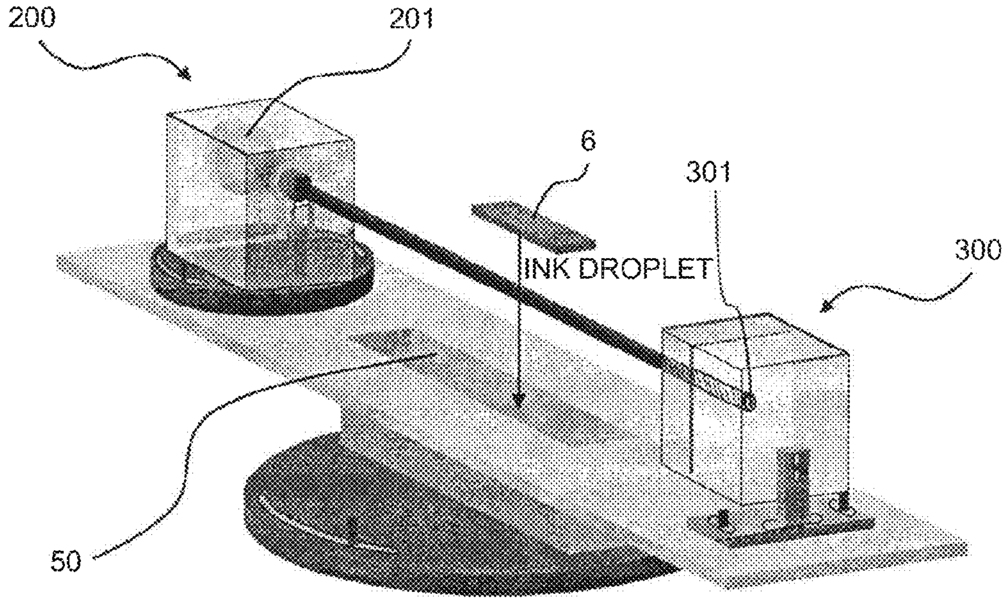
FIG. 5 illustrates a schematic configuration example of an ink detection unit Md.

The ink detection unit Md according to this embodiment includes a pair of the LD 201 of the light-emitting unit 200 and the PD 301 of the light-receiving unit 300 as illustrated in FIG. 5. Note that in this embodiment, one unit including the pair of the LD 201 and the PD 301 is used; alternatively, the LD 201 may be any light-emitting element as long as it can emit light and the PD 301 may be any light-receiving element as long as it can receive light and generate an electric signal according to an amount of received light.

An installation plane of the ink detection unit Md of this embodiment is provided with a liquid waste tank 50 to collect an ink droplet discharged from the nozzle arrays of the recording head 6 as illustrated in FIG. 5. The ink detection unit Md of this embodiment includes the liquid waste tank 50 between the image formation region 16 and the cap unit 22 (a home position); therefore, even if an ink droplet is discharged from the nozzle array of the recording head 6 between the image formation region 16 and the cap unit 22, the discharged ink droplet can be collected.

Figure 6:
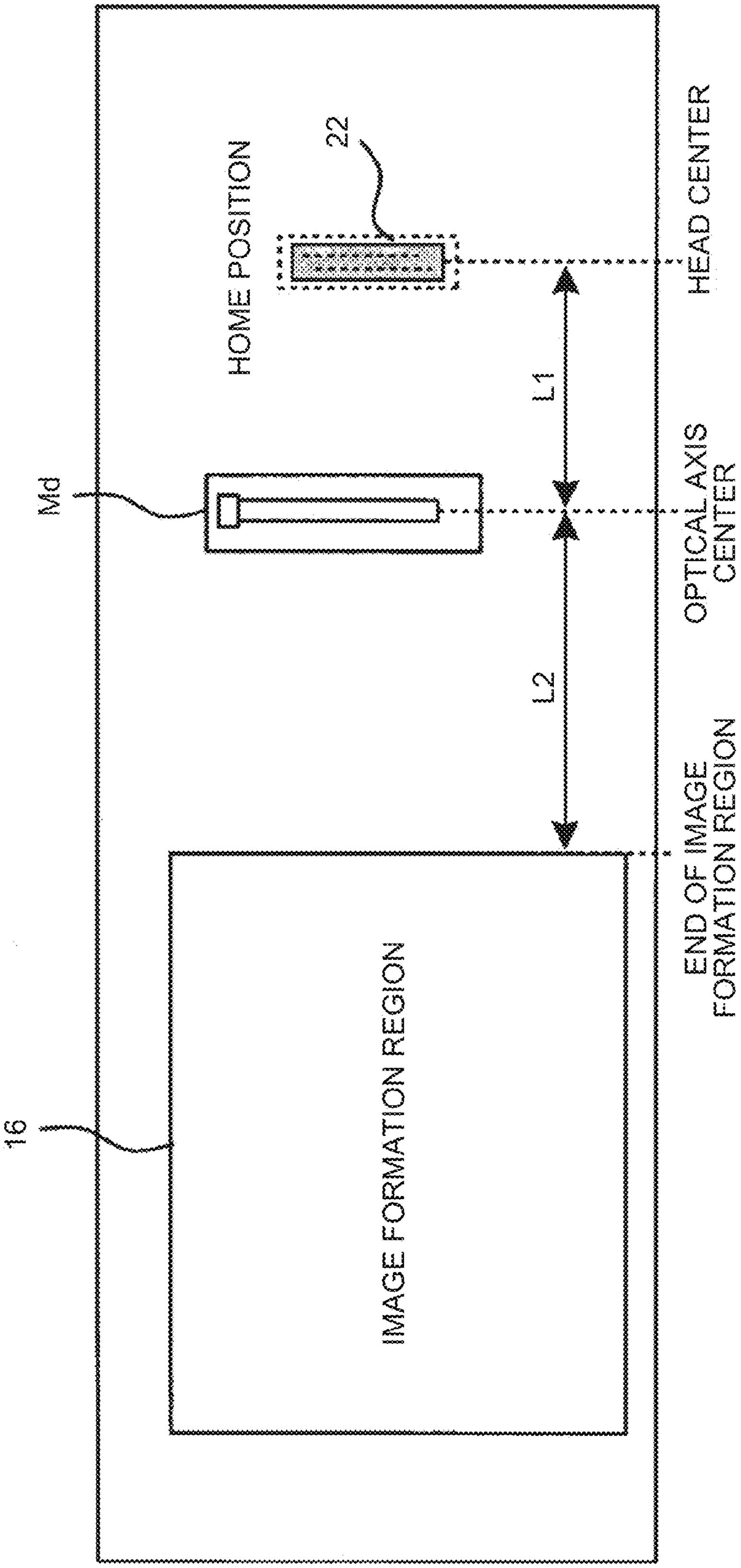
FIG. 6 illustrates a position of an ink detection unit Md.

In the recording device according to this embodiment, a position of the image formation region 16 is fixed in advance, and positions of the ink detection unit Md and the cap unit 22 are also fixed in advance. Therefore, a distance (L1) between an optical axis center of the ink detection unit Md and the home position and a distance (L2) between the optical axis center of the ink detection unit Md and an end of the image formation region are also fixed values as illustrated in FIG. 6. Therefore, once a positional relation between the nozzle array of the recording head 6 and the optical axis center of the ink detection unit Md is known, a distance between the nozzle array of the recording head 6 and the home position and a distance between the nozzle array of the recording head 6 and the end of the image formation region can be known; accordingly, the nozzle array of the recording head 6 can be moved to a desired position. Note that in FIG. 6, the optical axis center of the ink detection unit Md refers to the optical axis center of the LD light emitted from the LD 201 that forms the pair with the PD 301 that detects an ink droplet, and the recording head center refers to a center of the recording head 6 when the recording head 6 is located at the home position.

Figure 7A:
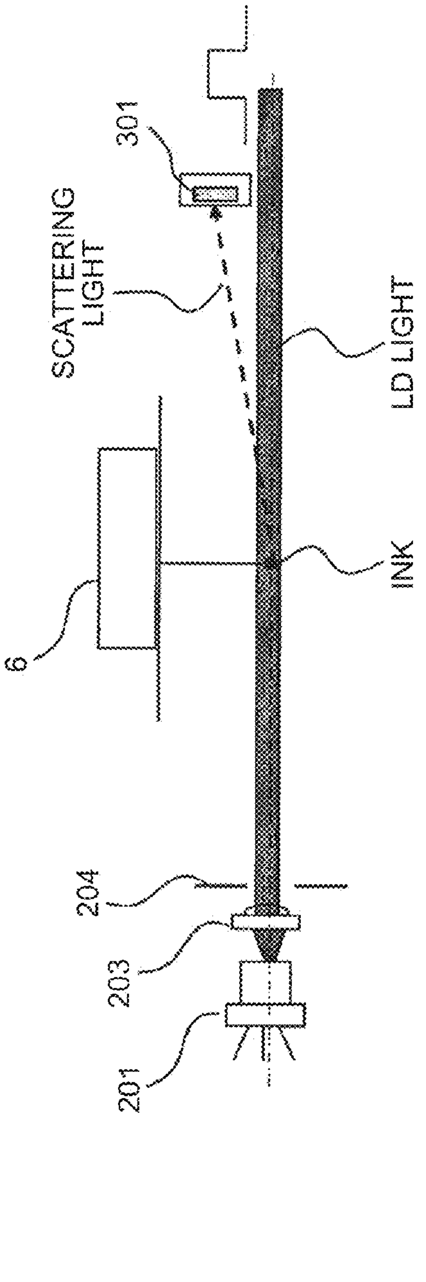
FIGS. 7A and 7B illustrate configuration examples of the ink detection unit Md of a scattering light detection type.
Figure 7B:
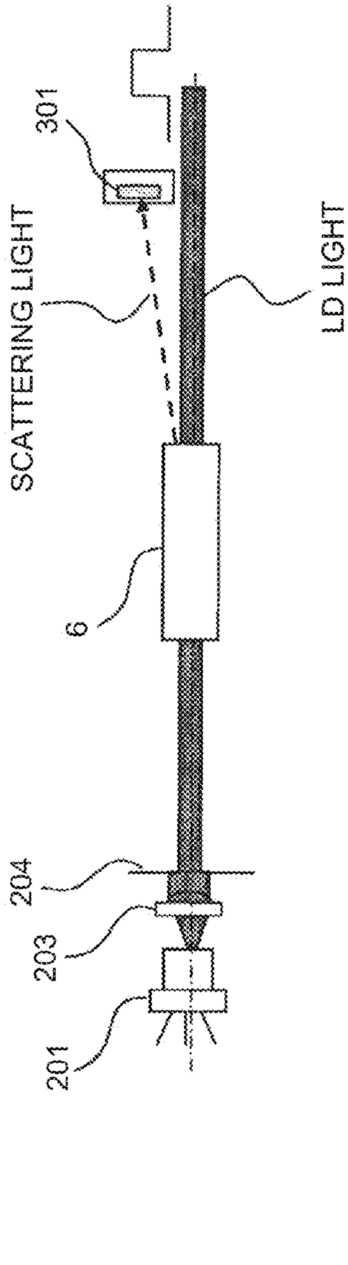

The ink detection unit Md according to this embodiment is the ink detection unit Md of scattering light detection type illustrated in FIGS. 7A and 7B. The light-emitting unit 200 includes an LD driver (202 in FIG. 2), the LD 201, a collimate lens 203, and an aperture 204. As illustrated in FIG. 7B, the LD light emitted from the LD 201 is shaped into parallel light through the collimate lens 203 and the LD light is narrowed down to have a desired light width in the main-scanning direction through the aperture 204.

The light-receiving unit 300 includes the PD 301 and the PD light-receiving circuit (302 in FIG. 2). The PD 301 is provided not at a position where the LD light is directly incident but at a position where scattering light generated when ink droplets discharged from the nozzle arrays of the recording head 6 intersect with the LD light is incident. Thus, when scattering light generated by the intersection between the ink droplets and the LD light enters the PD 301, the PD 301 feeds PD current that corresponds to the received light. Note that the PD 301 is located at the position where the scattering light is incident by, for example, performing an experiment performed in advance.

The PD light-receiving circuit 302 includes, as illustrated in FIG. 8, an I-V conversion circuit 3021, the amplifier 3022, a filter 3023, the comparator 3024, and a transistor 3025.

The I-V conversion circuit 3021 converts PD current generated in the PD 301 into voltage and generates an electric signal according to intensity of scattering light received in the PD 301. The amplifier 3022 amplifies the voltage converted in the I-V conversion circuit 3021, and outputs a first electric signal (PD_OUT1). The first electric signal (PD_OUT1) is an electric signal obtained by amplifying the electric signal obtained when the PD 301 receives scattering light, and corresponds to the scattering light intensity (PD_OUT1). The filter 3023 removes a noise from the first electric signal (PD_OUT1) amplified by the amplifier 3022. The comparator 3024 compares the first electric signal (PD_OUT1) output from the filter 3023 with a reference voltage, and outputs a second electric signal (PD_OUT2) which is binarized. The second electric signal (PD_OUT2) is an electric signal representing change of the first electric signal (PD_OUT1). The reference voltage of the comparator 3024 is adjusted to such a value that the electric signal (PD_OUT2) indicating detection of an ink droplet is output only when scattering light generated by intersection between an ink droplet and the LD light enters the PD 301. The first electric signal (PD_OUT1) output from the amplifier 3022 and the second electric signal (PD_OUT2) output from the transistor 3025 are output to the control unit 100. The control unit 100 generates second table information in which each nozzle and the gain value are associated with each other based on the output level of the first electric signal (PD_OUT1) output from the amplifier 3022 and first table information (information in which the scattering light intensity (PD_OUT1) and the gain values are associated with each other) stored in the storage unit 101, and holds the generated second table information. Then, based on the second table information, the control unit 100 changes a resistance value of a resistor R2 connected in parallel to the amplifier 3022 for each nozzle, adjusts the gain value of the PD light-receiving circuit 302 for each nozzle, and adjusts the output level of the first electric signal (PD_OUT1) output from the amplifier 3022 for each nozzle. Moreover, the control unit 100 detects the presence or absence of an ink droplet based on the output level of the second electric signal (PD_OUT2) output from the transistor 3025.

Processing Operation Example of Control Unit 100

Figure 9:
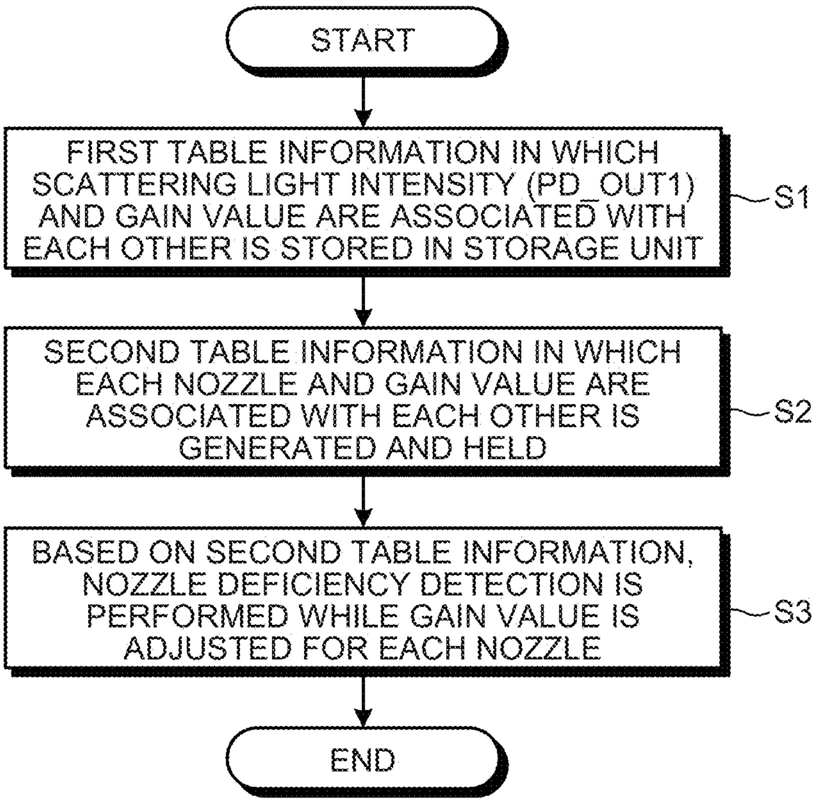
FIG. 9 illustrates a processing operation example of a recording device according to a first embodiment.

Next, a processing operation example of the recording device according to this embodiment is described with reference to FIG. 9.

First, the control unit 100 generates first table information in which the scattering light intensity (PD_OUT1) obtained by receiving scattering light in the PD 301 and gain values set in the PD light-receiving circuit 302 according to the scattering light intensity (PD_OUT1) are associated with each other, and stores the first table information in the storage unit 101 (Step S1). Note that first table information is generated in advance and stored in the storage unit 101.

Next, before nozzle deficiency detection, the control unit 100 discharges an ink droplet from an arbitrary nozzle of one nozzle array and acquires the scattering light intensity (PD_OUT1) obtained from the PD 301 when the ink droplet is discharged from the arbitrary nozzle. Based on the acquired scattering light intensity (PD_OUT1) for the arbitrary nozzle and the first table information stored in the storage unit 101, the second table information in which the arbitrary nozzle and a gain value according to the scattering light intensity (PD_OUT1) for the arbitrary nozzle are associated with each other is generated and held (Step S2).

Next, the control unit 100 performs nozzle deficiency detection while adjusting the gain value of the PD light-receiving circuit 302 for each nozzle in accordance with the second table information held in Step S2 (Step S3).

Since the arbitrary nozzle and a gain value are associated with each other in the second table information, by setting a gain value corresponding to each of the nozzles in the PD light-receiving circuit 302, the control unit 100 can generate the first electric signal (PD_OUT1) obtained by amplifying the electric signal acquired in the PD 301 by the gain value corresponding to each nozzle in the PD light-receiving circuit 302. As a result, even when the electric signal obtained in the PD 301 is weak, the output level of the first electric signal (PD_OUT1) can be increased and the second electric signal (PD_OUT2) representing change of the first electric signal (PD_OUT1) can be generated; based on the generated electric signal (PD_OUT2), nozzle deficiency detection can be performed.

Next, a specific processing operation example of the aforementioned Steps S1 to S3 is hereinafter described.

S1: Generation of First Table Information in which Scattering Light Intensity (PD_OUT1) and Gain Value are Associated with Each Other First, an example of generating the first table information in which the scattering light intensity (PD_OUT1) and a gain value are associated with each other is described. The recording device according to this embodiment needs to form a table in advance from relation between the scattering light intensity (PD_OUT1) (first electric signal) obtained from the PD 301 and a gain value set in the PD light-receiving circuit 302 according to the scattering light intensity (PD_OUT1), and to store the first table information made into the table in the storage unit 101. The relation between the scattering light intensity (PD_OUT1) and a gain value is determined in the following process.

Figure 10A:
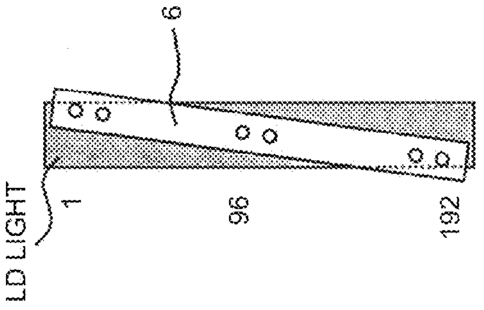
FIGS. 10A to 10D illustrate examples of generating first table information.
Figure 10B:
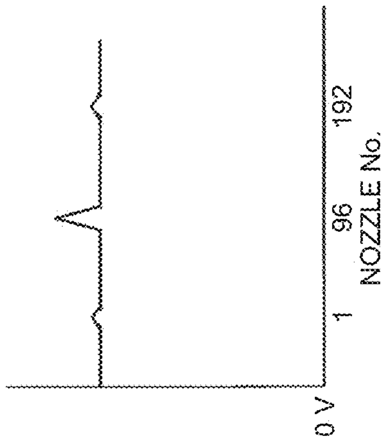

First, as illustrated in FIG. 10A, the recording head 6 is tilted from the optical axis of the LD light to the extent that an ink droplet discharged from each nozzle intersects with the LD light. As depicted in FIG. 10A, an ink droplet is discharged from each nozzle in a state that the recording head 6 is tilted; then, the scattering light intensity (PD_OUT1) (first electric signal) for each nozzle is acquired as depicted in FIG. 10B. Thus, the scattering light intensity (PD_OUT1) that depends on positional relationship between a nozzle and the LD light can be obtained as depicted in FIG. 10C.

Figure 10C:
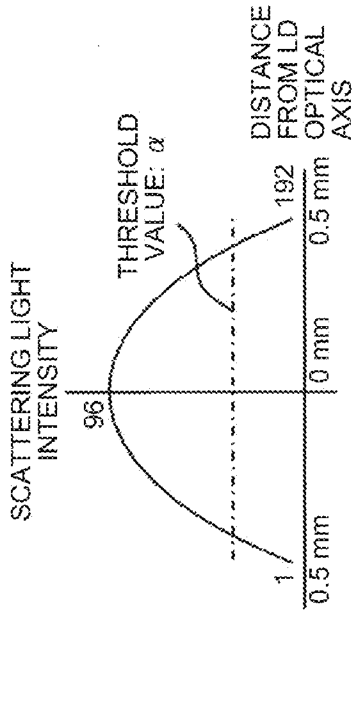
Figure 10D:
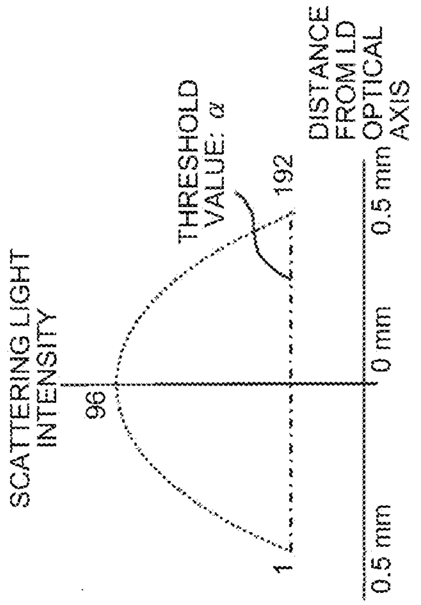

The PD light-receiving circuit 302 of this embodiment can output the electric signal (PD_OUT2) indicating detection of an ink droplet to the control unit 100 when the scattering light intensity (PD_OUT1) (first electric signal) obtained from the PD 301 is more than or equal to a threshold value $\alpha$ indicated in FIG. 10C; therefore, a gain value necessary to make the scattering light intensity (PD_OUT1) for each nozzle more than or equal to the threshold value $\alpha$ as indicated in FIG. 10D is made into a table while the gain value is associated with a corresponding level of the scattering light intensity (PD_OUT1), and the first table information made into the table is stored in the storage unit 101.

For example, assume that the recording head 6 includes 192 nozzles in one nozzle array, and has a nozzle ink droplet discharge interval of 1 ms and a width of LD light of 1 mm as illustrated in FIGS. 10A to 10D.

In this case, first, the recording head 6 is tilted from the optical axis of the LD light to the extent that ink droplets discharged from the first nozzle and the 192nd nozzle intersect with the LD light as illustrated in FIG. 10A. Then, ink droplets are sequentially discharged from the nozzles and the scattering light intensity (PD_OUT1) is acquired for each nozzle as illustrated in FIG. 10B. The horizontal axis of FIG. 10B indicates the nozzle number while the vertical axis thereof indicates the scattering light intensity (PD_OUT1) (a voltage value for the scattering light intensity obtained from the PD 301). Thus, the scattering light intensity (PD_OUT1) depending on the positional relationship between the nozzles and the LD light can be acquired as illustrated in FIG. 10C. The horizontal axis of FIG. 10C indicates distance from the optical axis of the LD light, while the vertical axis thereof indicates the scattering light intensity (PD_OUT1) (the value corresponding to change of the scattering light intensity obtained from the PD 301). Note that FIGS. 10A to 10D depict only the scattering intensity (PD_OUT1) for the first nozzle, the 96th nozzle, and the 192nd nozzle.

In FIG. 10A, the 96th nozzle in the center of the nozzle array is located at the optical axis of the LD light, and the first nozzle and the 192nd nozzle at both ends of the nozzle array are located at ends of the LD light. Therefore, the scattering light intensity (PD_OUT1) acquired in a state illustrated in FIG. 10A is maximum for a nozzle located at the optical axis of the LD light (for a case when an ink droplet and the LD light are in contact with each other at the optical axis of the LD light), and is minimum for a nozzle furthest from the optical axis of the LD light (for a case when an ink droplet and the LD light are in contact with each other at a position furthest from the optical axis of the LD light) as depicted in FIG. 10C.

Therefore, in this embodiment, a table is formed in which gain values that make even the scattering light intensity (PD_OUT1) obtained from the first nozzle and the 192nd nozzle more than or equal to the threshold value $\alpha$ are associated with respective levels of the scattering light intensity (PD_OUT1) as illustrated in FIG. 10D, and the first table information made into the table is stored in the storage unit 101 so that the presence or absence of an ink droplet can be detected even from the scattering light intensity (PD_OUT1) obtained for a nozzle far from the optical axis of the LD light. Thus, the first table information in which the scattering light intensity (PD_OUT1) and gain values are associated with each other can be stored in the storage unit 101 and managed. In this embodiment, a small gain value is associated with the high scattering light intensity (PD_OUT1) and a large gain value is associated with the low scattering light intensity (PD_OUT1) in the first table information, which is stored in the storage unit 101 in advance and managed.

Note that gain values do not need to be set minutely for each predetermined levels of the scattering light intensity (PD_OUT1), and may be set in at least two stages. For example, gain values may be set so that the presence or absence of an ink droplet from even a nozzle for which the scattering light intensity (PD_OUT1) is minimum can be detected, and saturation is not reached for a nozzle for which the scattering light intensity (PD_OUT1) is maximum. The saturation means a state in which light intensity of light which the PD 301 normally receives is amplified to the same level as the light intensity obtained when the PD 301 receives directly the LD light, resulting in that whether the PD 301 receives scattering light or not cannot be detected.

After the gain values are set, that the scattering light intensity (PD_OUT1) for all the nozzles is more than or equal to the threshold value α as illustrated in FIG. 10D and thus the presence or absence of an ink droplet can be detected is confirmed and then, generation of the first table information ends.

Figure 11:
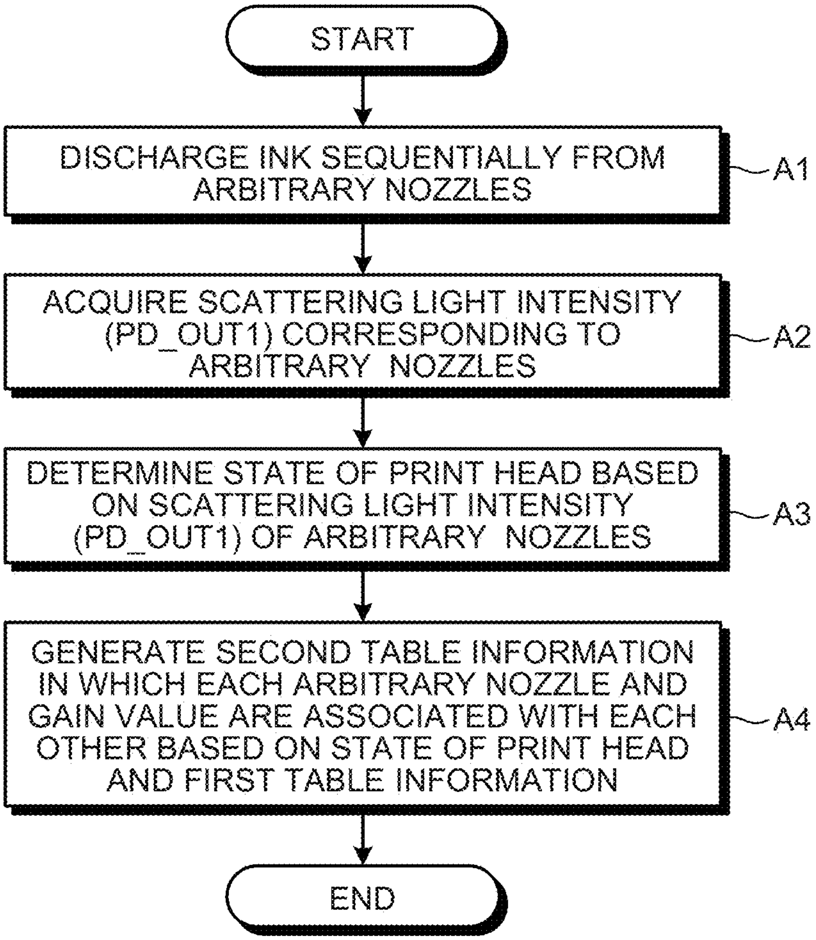
FIG. 11 illustrates an example of generating second table information.

S2: Generation of Second Table Information in which Arbitrary Nozzle and Gain Value are Associated with Each Other Next, an example of generating second table information in which each arbitrary nozzle and a gain value are associated with each other is described with reference to FIG. 11.

First, ink droplets are sequentially discharged from arbitrary nozzles of one nozzle array (Step A1) and the scattering light intensity (PD_OUT1) for the arbitrary nozzles is acquired (Step A2).

Next, based on the acquired scattering light intensity (PD_OUT1) for the arbitrary nozzles, a state of the recording head 6 is determined (Step A3).

Next, based on the state of the recording head 6 which is determined in Step A3 and the first table information stored in advance in the storage unit 101, the second table information in which each of the arbitrary nozzles and a gain value are associated with each other is generated (Step A4).

Figure 12A:
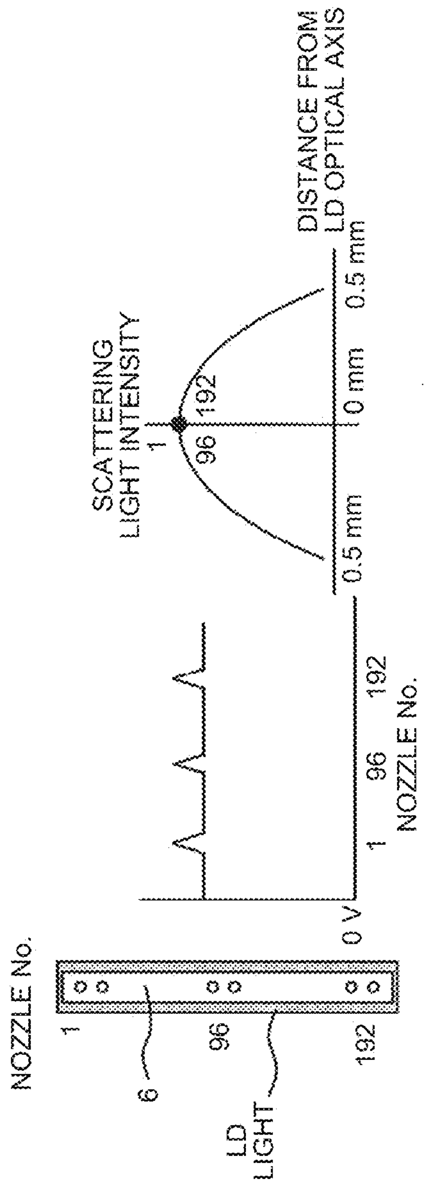
FIGS. 12A and 12B illustrate states in which a recording head 6 is not tilted from an optical axis of LD light.
Figure 12B:
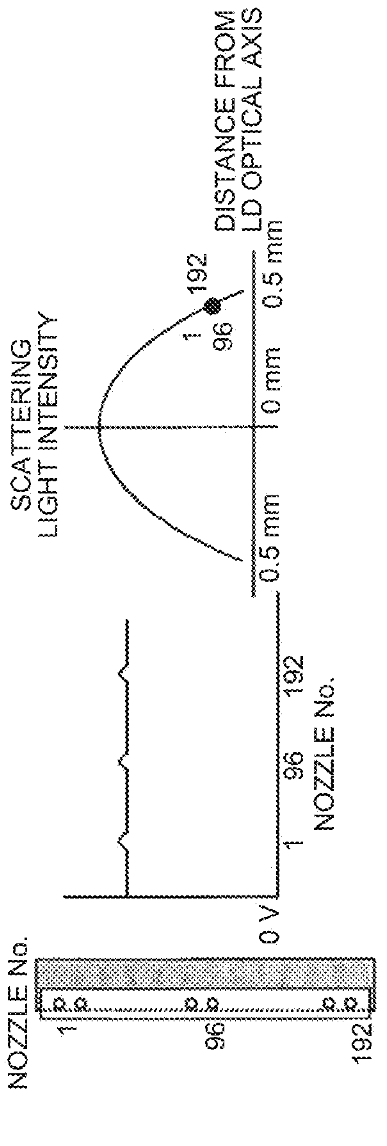

For example, in the case where the state of the recording head 6 determined in Step A3 is a state in which the recording head 6 is not tilted, the scattering light intensity (PD_OUT1) for the arbitrary nozzles is constant as illustrated in FIGS. 12A and 12B and the scattering light intensity (PD_OUT1) for the arbitrary nozzles decreases with distance from the optical axis of the LD light. Therefore, when the recording head 6 is not tilted, a gain value corresponding to the scattering light intensity (PD_OUT1) should be set for the arbitrary nozzles.

In FIG. 12A, since the scattering light intensity (PD_OUT1) is constant for the arbitrary nozzles (first nozzle, 96th nozzle, and 192nd nozzle) and the arbitrary nozzles is located at the optical axis of the LD light, a gain value according to the scattering light intensity (PD_OUT1) illustrated in FIG. 12A is set for the arbitrary nozzles. In FIG. 12B, since the scattering light intensity (PD_OUT1) is constant for the arbitrary nozzles (first nozzle, 96th nozzle, and 192nd nozzle) and the arbitrary nozzles are located displaced from the optical axis of the LD light, a gain value according to the scattering light intensity (PD_OUT1) illustrated in FIG. 12B is set for the arbitrary nozzles.

In the case where the state of the recording head 6 which is determined in Step A3 is a state in which the recording head 6 is tilted, the scattering light intensity (PD_OUT1) is different for the arbitrary nozzles and the scattering light intensity (PD_OUT1) decreases with distance from the optical axis of the LD light as illustrated in FIG. 13. Therefore, in the case where the recording head 6 is tilted, gain values according to the scattering light intensity (PD_OUT1) for the arbitrary nozzles should be set in association with the arbitrary nozzles based on the first table information.

Figure 13A:
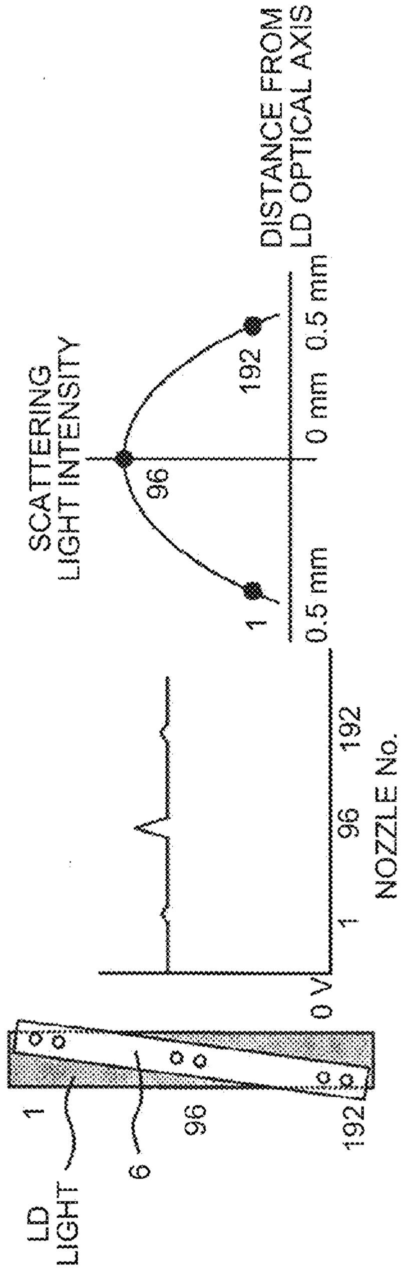
FIGS. 13A and 13B illustrate a state in which the recording head 6 is tilted from the optical axis of the LD light.
Figure 13B:
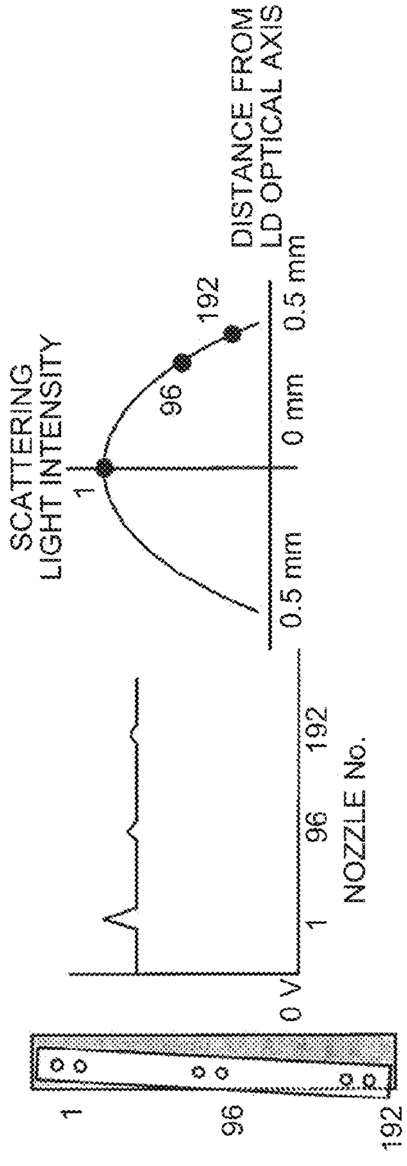
Figure 14:
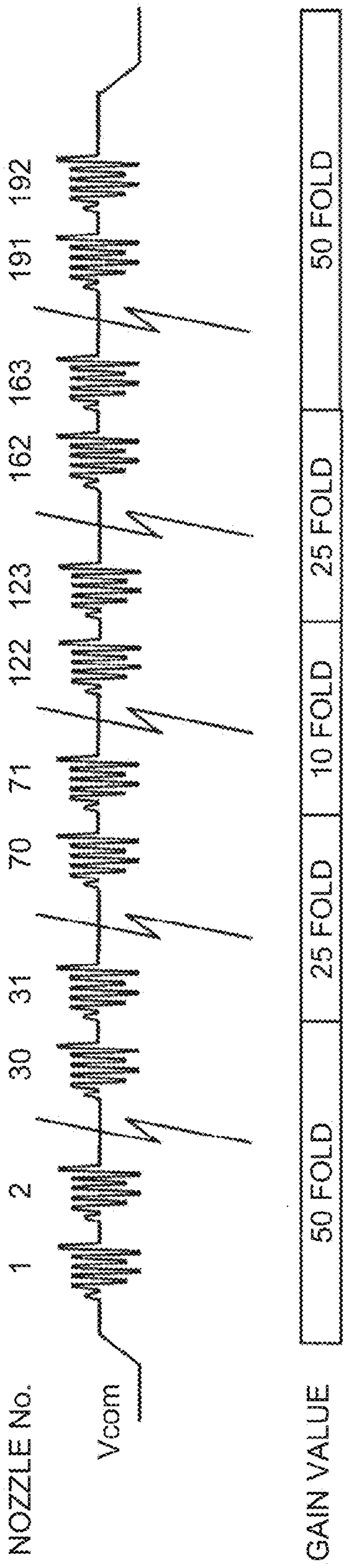
FIG. 14 illustrates an example of a method of adjusting a gain value when detecting nozzle deficiency.

In FIGS. 13A and 13B, the scattering light intensity (PD_OUT1) is different for the arbitrary nozzles (first nozzle, 96th nozzle, and 192nd nozzle) and the scattering light intensity (PD_OUT1) decreases with distance from the optical axis of the LD light; therefore, gain values in accordance with the scattering light intensity (PD_OUT1) for the arbitrary nozzles illustrated in FIGS. 13A and 13B are set for the arbitrary nozzles.

Thus, the control unit 100 can generate second table information in which each arbitrary nozzle and a gain value are associated with each other, and the control unit 100 holds the second table information.

In the above processing operation, ink droplets are sequentially discharged from arbitrary nozzles, the scattering light intensity (PD_OUT1) for the arbitrary nozzles is acquired, and second table information in which a gain value according to the scattering light intensity (PD_OUT1) for each of the arbitrary nozzles and corresponding one of the arbitrary nozzles are associated with each other is generated. Alternatively, it is also possible to discharge an ink droplet from each nozzle, to acquire the scattering light intensity (PD_OUT1) for each nozzle, and to generate second table information in which a gain value according to the scattering light intensity (PD_OUT1) for each nozzle and the corresponding nozzle are associated with each other. However, when an ink droplet is discharged sequentially from each nozzle, the aforementioned generation of the second table information takes time and consumption of ink increases. Therefore, it is preferable that ink droplets be discharged sequentially from arbitrary nozzles and second table information in which a gain value according to the scattering light intensity (PD_OUT1) for each of the arbitrary nozzles and corresponding one of the arbitrary nozzles are associated with each other be generated.

Note that in the case where ink droplets are discharged sequentially from the arbitrary nozzles, the state of the recording head 6 (tilt of the recording head 6, and distance from the optical axis of the LD light) can be determined by discharging ink droplets from nozzles located at both ends of a nozzle array (first nozzle and 192nd nozzle) and a nozzle in the center of the nozzle array (96th nozzle), and acquiring the scattering light intensity (PD_OUT1) for the nozzles. Therefore, it is preferable that ink droplets be discharged from nozzles located at both ends of a nozzle array and a nozzle located at the center of the nozzle array and the scattering light intensity (PD_OUT1) for the nozzles be acquired. This can shorten time to generate second table information and reduce consumption of ink.

S3: Nozzle Deficiency Detection

Next, a processing operation example of nozzle deficiency detection is described with reference to FIG. 8.

When an ink droplet is discharged from each nozzle, the control unit 100 adjusts the gain value of the PD light-receiving circuit 302 for each nozzle by changing the resistance value of the resistor R2 connected in parallel to the amplifier 3022 for each nozzle based on second table information generated in Step S2. Since the second table information in which each arbitrary nozzle and a gain value are associated with each other, the control unit 100 changes the resistance value of the resistor R2 connected in parallel to the amplifier 3022 for each nozzle and adjusts the gain value of the PD light-receiving circuit 302 to a gain value according to each nozzle, based on the second table information. For example, in the second table information, assume that a gain value is 50 fold for first to 30th nozzles, a gain value is 25 fold for 31st to 70th nozzles, a gain value is 10 fold for 71st to 122nd nozzles, a gain value is 25 fold for 123rd to 162nd nozzles, and a gain value is 50 fold for 163rd to 192nd nozzles. In this case, the control unit 100 changes the resistance value of the resistor R2 for each nozzle, so that the gain value of the PD light-receiving circuit 302 is adjusted to 50 fold for the first to 30th nozzles, the gain value of the PD light-receiving circuit 302 is adjusted to 25 fold for the 31st to 70th nozzles, the gain value of the PD light-receiving circuit 302 is adjusted to 10 fold for the 71st to 122nd nozzles, the gain value of the PD light-receiving circuit 302 is adjusted to 25 fold for the 123rd to 162nd nozzles, and the gain value of the PD light-receiving circuit 302 is adjusted to 50 fold for the 163rd to 192nd nozzles, and performs nozzle deficiency detection. Thus, an output level of the first electric signal (PD_OUT1) output from the amplifier 3022 is adjusted for each nozzle, and the PD light-receiving circuit 302 can output the second electric signal (PD_OUT2) representing change of the first electric signal (PD_OUT1) from the transistor 3025 to the control unit 100 based on the first electric signal (PD_OUT1) generated after being adjusted to the gain value according to each nozzle. As a result, the control unit 100 can detect the presence or absence of an ink droplet based on an output level of the second electric signal (PD_OUT2).

Note that a method of adjusting the gain value of the PD light-receiving circuit 302 includes a method in which an analog switch is used and a method in which a photocoupler is used, for example. Specific description of each method is made below.

Method in which Analog Switch is Used

First, an example of a method in which the gain value of the PD light-receiving circuit 302 is adjusted using an analog switch is described. The analog switch may be NJU4066, for example.

Figure 15:
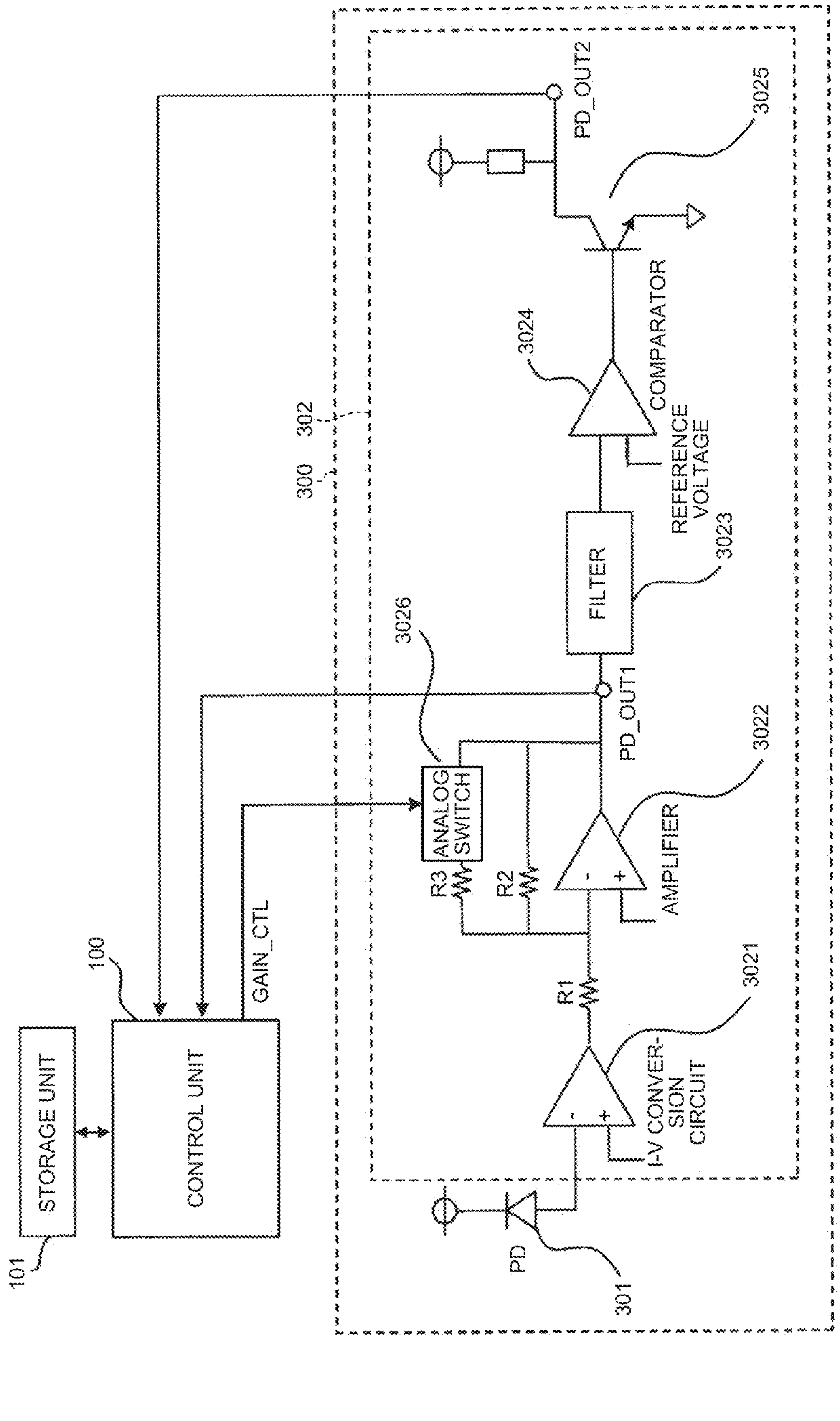
FIG. 15 illustrates a first configuration example of adjusting a gain value of a PD light-receiving circuit 302.
Figure 16:
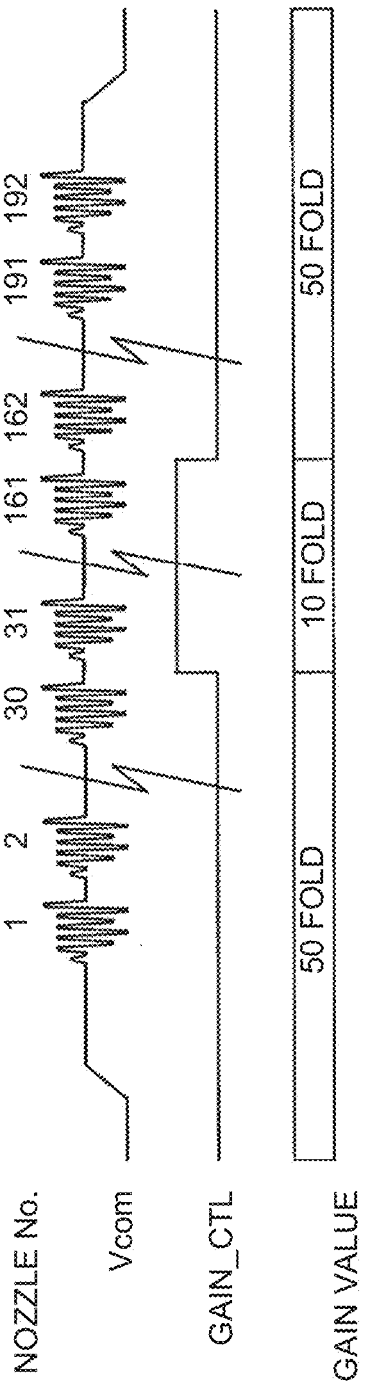
FIG. 16 illustrates an example of a method of adjusting the gain value when detecting nozzle deficiency.

When the gain value of the PD light-receiving circuit 302 is adjusted using an analog switch, as, for example, illustrated in FIG. 15, an analog switch 3026 is connected to one (third resistor R3) of negative feedback resistors R2 and R3 connected in parallel to the amplifier 3022. FIG. 15 illustrates the schematic configuration example of the light-receiving unit 300 illustrated in FIG. 2. Assuming that the gain value is normally desired to be 50 fold and the gain is desirably switched to 10 fold, the first resistor R1 has a resistance of 10 kΩ, the second resistor R2 has a resistance of 500 kΩ, and the third resistor R3 has a resistance of 25 kΩ; normally, the gain value of the PD light-receiving circuit 302 is made 50 fold by inputting a low signal from the control unit 100 to the analog switch 3026 and when the gain is switched, the gain value of the PD light-receiving circuit 302 is switched to 10 fold by inputting a high signal to the analog switch 3026. FIG. 16 is a timing chart corresponding to this case. In FIG. 16, the gain value of the PD light-receiving circuit 302 is adjusted to 50 fold for first to 30th nozzles and 162nd to 192nd nozzles, and the gain value of the PD light-receiving circuit 302 is adjusted to 10 fold for 31st to 161st nozzles, and nozzle deficiency detection is performed. Thus, the output level of the first electric signal (PD_OUT1) output from the amplifier 3022 is adjusted for each nozzle and the PD light-receiving circuit 302 can output the second electric signal (PD_OUT2) representing change of the first electric signal (PD_OUT1) from the transistor 3025 to the control unit 100 based on the first electric signal (PD_OUT1) generated after being adjusted to the gain value according to each nozzle. As a result, the control unit 100 can detect the presence or absence of an ink droplet based on the output level of the second electric signal (PD_OUT2). Note that in the configuration example illustrated in FIG. 15, the analog switch 3026 is connected to one (third resistor R3) of the two negative feedback resistors R2 and R3 connected in parallel to the amplifier 3022, and the gain value of the PD light-receiving circuit 302 is switched by switching a resistance value of a resistor connected in parallel to the amplifier 3022. However, the configuration example of FIG. 15 is one example and alternatively, three or more resistors may be connected in parallel to the amplifier 3022 and the analog switch 3026 may switch resistors in a stepwise manner to switch resistance value of a resistor connected in parallel to the amplifier 3022 in multiple stages.

Method in which Photocoupler is Used

Next, an example of a method in which the gain value of the PD light-receiving circuit 302 is adjusted using a photocoupler is described. The photocoupler may be a Cds cell, for example.

In a photocoupler such as a Cds cell, a light-emitting unit and a light-receiving unit are united and packaged, and the resistance value of the light-receiving unit changes depending on intensity of light emitted from the light-emitting unit. Change in a resistance vale of the light-receiving unit leads to change in the gain value of the amplifier 3022. Therefore, nozzle deficiency detection can be performed while adjusting the gain value of the PD light-receiving circuit 302 for each nozzle in a manner similar to a case of the analog switch 3026.

Figure 17A:
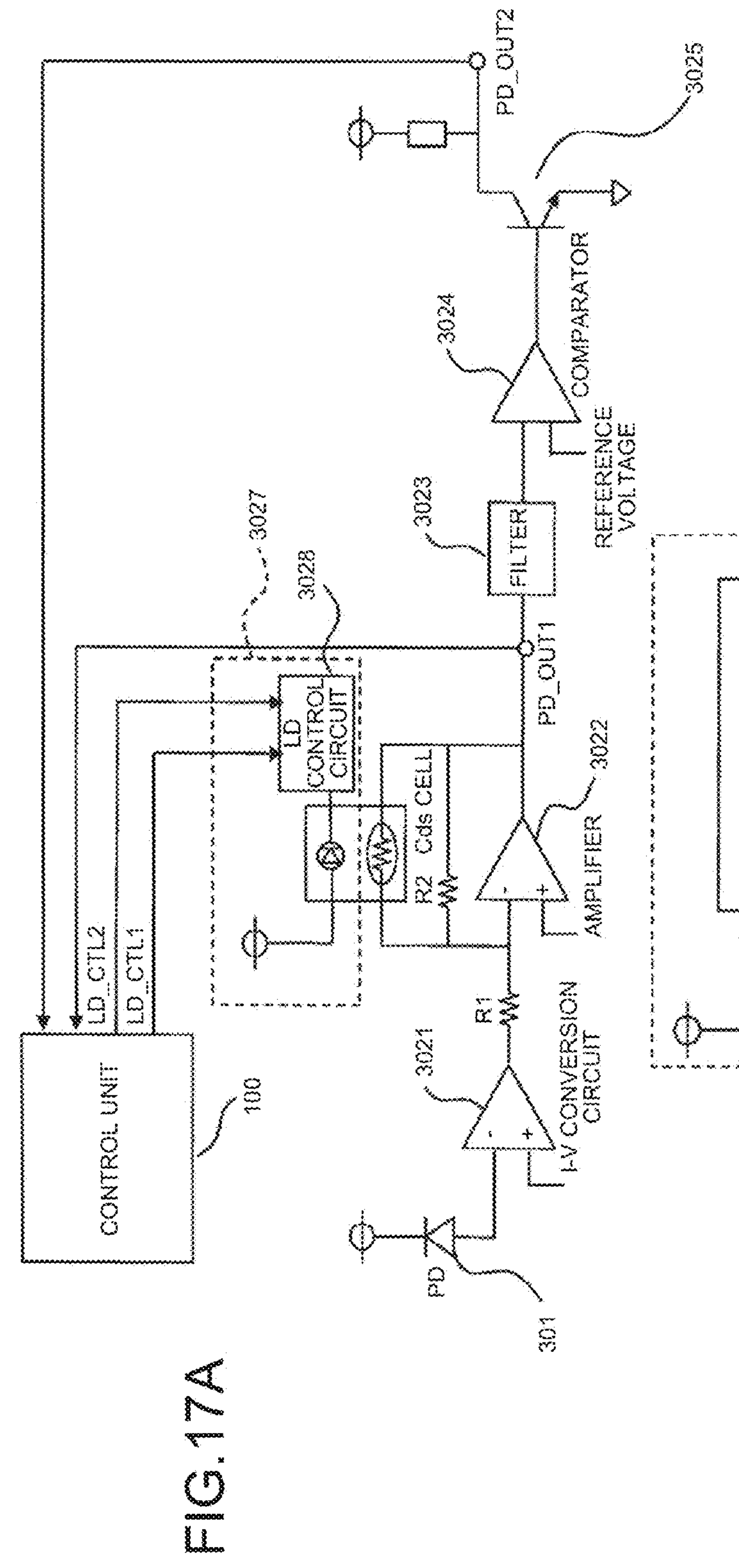
FIGS. 17A and 17B illustrate a second configuration example of adjusting the gain value of the PD light-receiving circuit 302.
Figure 17B:
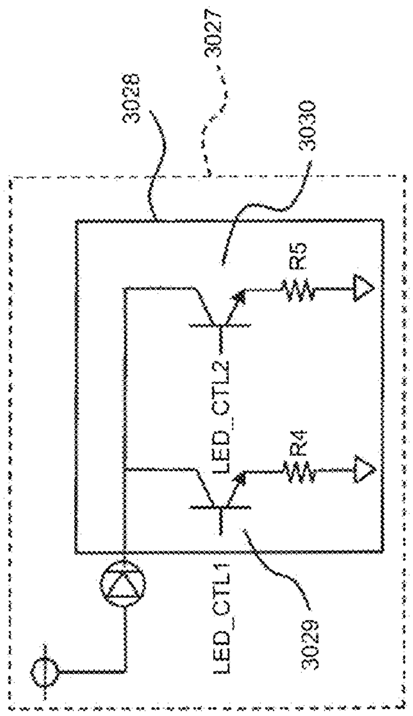

Examples of a measure to change light emission intensity of the light-emitting unit includes a method in which, as illustrated in FIGS. 17A and 17B, an LD control circuit 3028 is provided and a fourth resistor R4 and a fifth resistor R5 with different resistance values are attached to two transistors 3029 and 3030 constituting the LD control circuit 3028, and the light emission intensity of the light-emitting unit is controlled using a signal from the control unit 100. Note that FIG. 17A illustrates a schematic configuration example of the light-receiving unit 300 illustrated in FIG. 2 and FIG. 17B illustrates the configuration example by magnifying a portion denoted with 3027 in FIG. 17A. In a case of the configuration illustrated in FIGS. 17A and 17B, for example, power supply voltage supplied to the LD of the light-emitting unit is V, a voltage drop of the LD is VD, and current flowing through the LD is I. More specifically, V=3.3 V, VD=0.7 V, R4=1 kΩ, and R5=2 kΩ.

In this case, when the control unit 100 makes LD_CTL1 high and LD_CTL1 low, I=(V−VD)/R4=2.6 mA is reached. Meanwhile, when LD_CTL1 is low and LD_CTL2 is high, I=(V−VD)/R5=1.3 mA is reached. Thus, the current flowing through the LD of the light-emitting unit can be controlled using the signals LD_CTL1 and LD_CTL2 from the control unit 100, so that an amount of light of the LD of the light-emitting unit can be controlled and the gain value of the PD light-receiving circuit 302 can be adjusted for each nozzle. The configuration example illustrated in FIGS. 17A and 17B is one example; alternatively, with the use of PWM as a signal from the control unit 100, one transistor can control light emission intensity of the LD of the light-emitting unit by changing duty of the PWM.

The above two methods are examples; alternatively, the gain value of the PD light-receiving circuit 302 can be adjusted using a variable gain amplifier such as AD8330 (ANALOG DEVICES). That is, a method of adjusting the gain value is not particularly limited as long as the gain value of the PD light-receiving circuit 302 can be adjusted for each nozzle; any adjustment method is applicable.

Operation and Effect of Recording Device According to this Embodiment

In the recording device according to this embodiment, scattering light generated by intersection between the LD light emitted from the LD 201 of the light-emitting unit 200 and an ink droplet discharged from each nozzle of each nozzle array of the recording head 6 is converted into an electric signal in the PD 301 of the light-receiving unit 300. Then, the electric signal is amplified in the PD light-receiving circuit 302 of the light-receiving unit 300 to generate the first electric signal (PD_OUT1). Moreover, the second electric signal (PD_OUT2) representing change of the first electric signal (PD_OUT1) is generated. The control unit 100 determines the presence or absence of an ink droplet based on the second electric signal (PD_OUT2) generated in the PD light-receiving circuit 302. Note that in the recording device according to this embodiment, second table information in which gain values corresponding to the first electric signal (PD_OUT1) generated when arbitrary nozzles of the nozzle array of the recording head 6 discharge ink droplets and the arbitrary nozzles are associated with each other is generated, and control is performed so that the electric signal is amplified by a gain value according to a corresponding nozzle based on the generated second table information when an ink droplet is discharged sequentially from each nozzle of each nozzle array of the recording head 6. Thus, even when the electric signal obtained in the PD 301 at the time of generation of scattering light is weak, the output level of the first electric signal (PD_OUT1) can be increased and the second electric signal (PD_OUT2) representing change of the first electric signal (PD_OUT1) can be generated. As a result, difference in an amount of received light between in the case where there is an ink droplet and in the case where there are no ink droplets can be clarified without the use of a reflection member or the like; thus, ink detection can be performed.

Second Embodiment

Next, a second embodiment is described.

Figure 18:
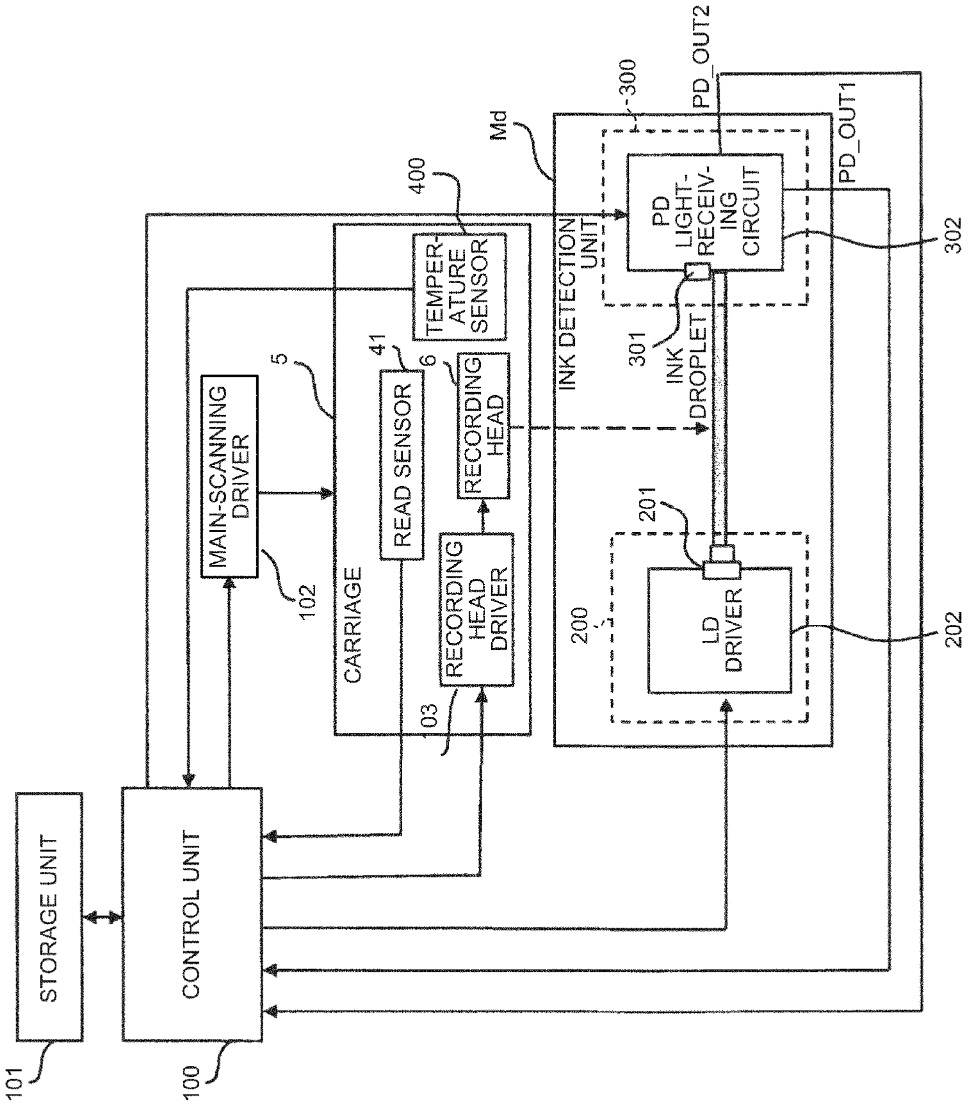
FIG. 18 illustrates a schematic configuration example of a control mechanism of a recording device according to a second embodiment.
Figure 19:
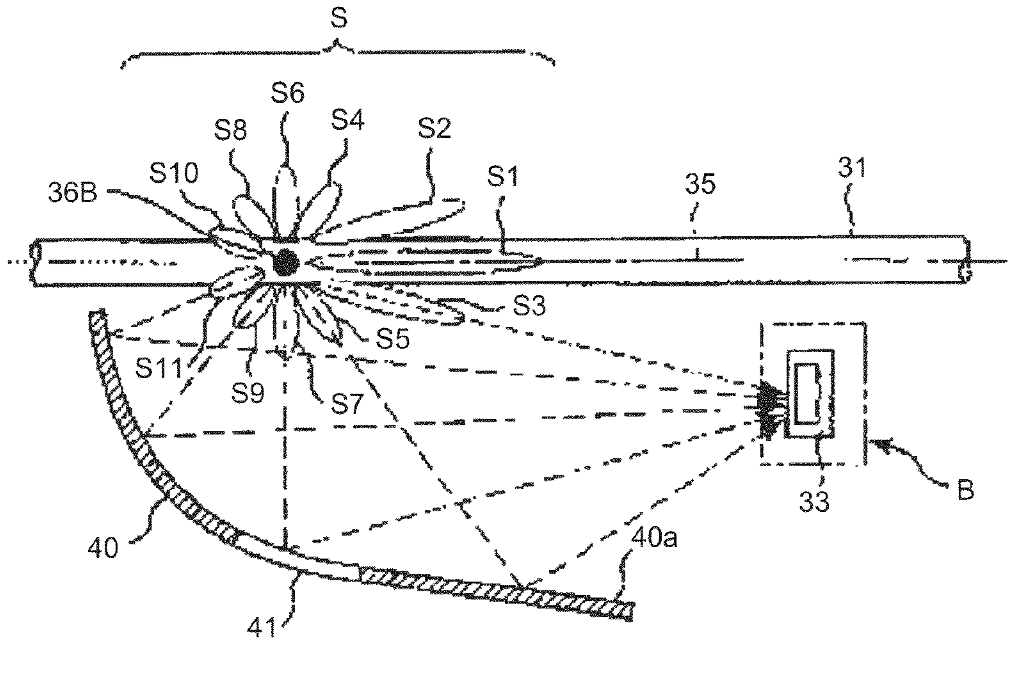
FIG. 19 illustrates a configuration example of increasing an amount of scattering light received in the light-receiving unit 33 using the reflection member 40.
Figure 20A:
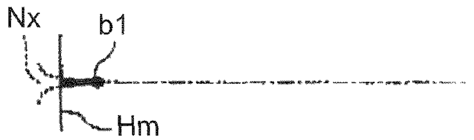
FIGS. 20A to 20F are diagrams that describes an example in which the mist m is generated when the ink droplet B is formed.
Figure 20D:
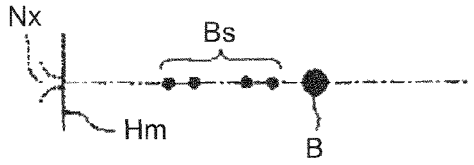
Figure 20B:
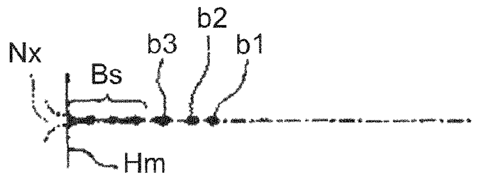
Figure 20E:
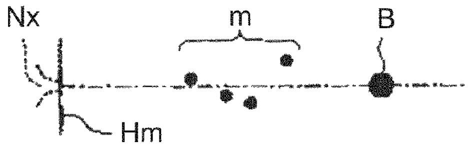
Figure 20C:
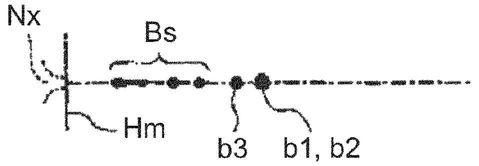
Figure 20F:
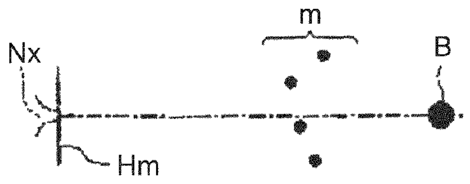

A recording device according to the second embodiment includes a temperature sensor 400 provided in the carriage 5 having the recording head 6 mounted thereon, as illustrated in FIG. 18; in accordance with temperature obtained by the temperature sensor 400, aforementioned second table information is newly generated.

The general carriage 5 is provided with a holder, on which the recording head 6 is mounted. In this embodiment, the temperature sensor 400 is disposed in the vicinity of the holder of the carriage 5 and second table information is newly generated when the temperature obtained by the temperature sensor 400 is more than or equal to a threshold value set in advance.

When the recording head 6 is assembled, no tilt is caused in the recording head 6. However, change in temperature around the recording head 6 (especially temperature rise) might loosen or deform a portion that fastens the recording head 6 to the carriage 5 and tilt the recording head 6. A tilt of the recording head 6 results in change of second table information in which each arbitrary nozzle and a gain value are associated with each other.

For this reason, in this embodiment, when the temperature obtained by the temperature sensor 400 is more than or equal to the threshold value set in advance, second table information is newly generated. Thus, second table information can be generated efficiently only when it is necessary, which can shorten time of nozzle deficiency detection or suppress consumption of ink.

Operation and Effect of Recording Device According to this Embodiment

In this manner, in the recording device according to this embodiment, the temperature sensor 400 is provided and second table information is generated when the temperature obtained by the temperature sensor 400 is more than or equal to the threshold value set in advance. Accordingly, second table information is generated when the recording head 6 is tilted; therefore, second table information can be generated efficiently only when it is necessary and moreover time of nozzle deficiency detection can be reduced and consumption of ink can be suppressed.

The aforementioned embodiments are preferred embodiments of the present invention and do not limit scope of the invention to the above embodiments only. Various modifications can be made without departing from the gist of the present invention.

For example, the above embodiments have described an example in which ink droplets are discharged from arbitrary nozzles of one nozzle array, second table information in which the arbitrary nozzles and gain values are associated with each other is generated, and nozzle deficiency detection for one nozzle array is performed based on the generated second table information. Alternatively, even when there are plural nozzle arrays, nozzle deficiency detection for each nozzle array can be performed using second table information for each nozzle array in the same manner as in the above embodiments.

Moreover, control operation of each unit included in the recording device according to the above embodiments can be executed using hardware, software, or a complex configuration including the both.

In the case of executing processing with software, a program recording processing sequence can be installed in a computer incorporated in dedicated hardware and be executed. Alternatively, the program can be installed in a versatile computer capable of executing various processing and be executed.

For example, the program can be recorded in advance in a hard disk or ROM (read only memory) as a recording medium. Alternatively, the program can be stored (recorded) temporarily or permanently in a removable recording medium. Such a removable recording medium can be provided as packaged software. Note that examples of the removable recording medium includes a floppy (registered trademark) disk, a CD-ROM (Compact Disc Read Only Memory), an MO (Magneto Optical) disc, a DVD (Digital Versatile Disc), a magnetic disc, a semiconductor memory.

Note that the program may be installed from the aforementioned removable recording medium to a computer, wirelessly transferred from a download site to a computer, or transferred with a wire to a computer via network.

The recording device according to the embodiments may perform processing operation described in the above embodiments either time sequentially or in parallel or individually as necessary in accordance with processing capability of a device executing processing.

According to the embodiments, difference in an amount of received light between in the case where there is an ink droplet and in the case where there are no ink droplets can be clarified without the use of a reflection member or the like.

According to the present invention, the difference in amount of receiving light in the case where there is an ink droplet and the case where there are no ink droplets can be clarified without using a reflection member or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording device including a nozzle array including a plurality of nozzles to discharge ink droplets, comprising:

a detection unit including a pair of a light-emitting unit and a light-receiving unit and converting scattering light generated by intersection between light emitted from the light-emitting unit and an ink droplet discharged from each of the nozzles of the nozzle array, into an electric signal in the light-receiving unit;

a first signal generation unit amplifying the electric signal converted by the light-receiving unit to generate a first electric signal;

a second signal generation unit generating a second electric signal representing change of the first electric signal;

a determination unit determining presence or absence of an ink droplet based on the second electric signal;

a relation information generation unit generating relation information in which an amplification value corresponding to the first electric signal generated when an arbitrary nozzle of the nozzle array discharges an ink droplet and the arbitrary nozzle are associated with each other; and a control unit performing control to amplify the electric signal at an amplification value according to a corresponding nozzle based on the relation information when ink droplets are sequentially discharged from the respective nozzles of the nozzle array.

2. The recording device according to claim 1, comprising a storage unit storing information in which the first electric signal and an amplification value corresponding to the first electric signal are associated with each other, wherein the relation information generation unit acquires an amplification value corresponding to the first electric signal generated when an ink droplet is discharged form the arbitrary nozzle, from the storage unit and generates the relation information by associating the acquired amplification value and the arbitrary nozzle.

3. The recording device according to claim 1, wherein the arbitrary nozzle includes nozzles located at both ends of the nozzle array and a nozzle located at a center of the nozzle array.

4. The recording device according to claim 1, wherein the control unit performs control to change a resistance value of the light-receiving unit to amplify the electric signal.

5. The recording device according to claim 1, comprising a temperature detection unit detecting temperature, wherein the relation information generation unit generates relation information when temperature detected by the temperature detection unit is more than or equal to a threshold value set in advance.

6. A control method performed in a recording device including a nozzle array including a plurality of nozzles to discharge ink droplets, comprising:

a detection step of converting scattering light generated by intersection between light emitted from a light-emitting unit and an ink droplet discharged from each of the nozzles of the nozzle array into an electric signal in a light-receiving unit;

a first signal generation step of amplifying the electric signal converted in the detection step to generate a first electric signal;

a second signal generation step of generating a second electric signal representing change of the first electric signal;

a determination step of determining presence or absence of an ink droplet based on the second electric signal;

a relation information generation step of generating relation information in which an amplification value corresponding to the first electric signal generated when an arbitrary nozzle of the nozzle array discharges an ink droplet and the arbitrary nozzle are associated with each other; and a control step of performing control to amplify the electric signal at an amplification value according to a corresponding nozzle based on the relation information when ink droplets are sequentially discharged from respective nozzles of the nozzle array.

* * * * *